United States Patent [19]
Ito et al.

[11] Patent Number: 5,485,371
[45] Date of Patent: Jan. 16, 1996

[54] METHOD FOR FORMING ENERGY SUBTRACTION RADIATON IMAGES, AND METHOD AND APPARATUS FOR SMOOTHING RADIATION IMAGES

[75] Inventors: Wataru Ito; Kazuo Shimura, both of Kanagawa, Japan

[73] Assignee: Fuji Photo Film Co., Ltd., Kanagawa, Japan

[21] Appl. No.: 654,450

[22] Filed: Feb. 12, 1991

[30] Foreign Application Priority Data

| | | | |
|---|---|---|---|
| Feb. 14, 1990 | [JP] | Japan | 2-32765 |
| Feb. 14, 1990 | [JP] | Japan | 2-32766 |
| Apr. 10, 1990 | [JP] | Japan | 2-94653 |
| Apr. 18, 1990 | [JP] | Japan | 2-102019 |

[51] Int. Cl.$^6$ .............................. H04N 5/32; G06F 15/00
[52] U.S. Cl. ....................... 364/413.23; 378/20; 378/62
[58] Field of Search ................... 364/413.13, 413.16, 364/413.23; 250/327 C, 327 D, 327 G, 484.1; 378/20, 62; 382/6, 54

[56] References Cited

U.S. PATENT DOCUMENTS

| | | |
|---|---|---|
| 4,761,739 | 8/1988 | Shimura . |
| 4,816,681 | 3/1989 | Shimura .................................. 358/451 |
| 4,837,733 | 6/1989 | Shiraishi et al. .................... 384/413.13 |
| 4,983,835 | 1/1991 | Takeo .................................. 250/327.2 |
| 5,020,085 | 5/1991 | Kawara et al. ........................... 378/99 |
| 5,029,083 | 7/1991 | Shimura et al. ..................... 250/327.2 |
| 5,029,586 | 7/1991 | Honda .................................. 128/653 R |
| 5,034,988 | 7/1991 | Fujiwara .................................... 382/6 |
| 5,056,529 | 10/1991 | Oe ........................................... 128/654 |
| 5,122,664 | 6/1992 | Ito et al. ................................ 250/327.2 |

FOREIGN PATENT DOCUMENTS

| | | |
|---|---|---|
| 0163903 | 12/1985 | European Pat. Off. . |
| 0331274 | 9/1989 | European Pat. Off. . |
| 61-5193 | 2/1986 | Japan . |
| 01273487 | 1/1990 | Japan . |

OTHER PUBLICATIONS

"Gazo–shori no Kihon–giho" (Basic Techniques for Images Processing) (Guide to Techniques Edition, by J. Hasgawa, Y. Koshimizu, A. Nakayama and S. Yokoi, Gijutsu Hyoron Sha).

*Primary Examiner*—Gail O. Hayes
*Assistant Examiner*—George N. Stevens
*Attorney, Agent, or Firm*—Sughrue, Mion, Zinn, Macpeak & Seas

[57] ABSTRACT

A method and apparatus for forming an energy subtraction image comprises recording a plurality of radiation images of an object on recording media by irradiating several kinds of radiation with different energy levels to the object, which is constituted of a plurality of tissues exhibiting different levels of radiation absorptivity with respect to the several kinds of radiation with different energy levels, and then detecting a plurality of original image signals representing the plurality of the radiation images. A first image signal, which represents a first image primarily composed of patterns of first tissues of the object, is generated from the plurality of the original image signals. A first smoothed image signal is generated by processing the first image signal, the first smoothed image signal representing a first smoothed image in which noise components of the first image have been reduced or eliminated. A second image signal is generated by subtracting the first smoothed image signal from an original image signal, the second image signal representing a second image primarily composed of patterns of second tissues of the object.

48 Claims, 13 Drawing Sheets

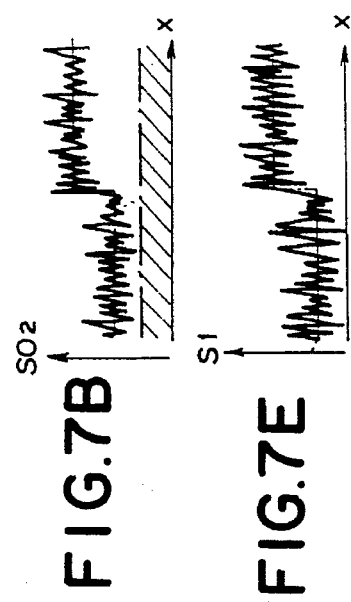
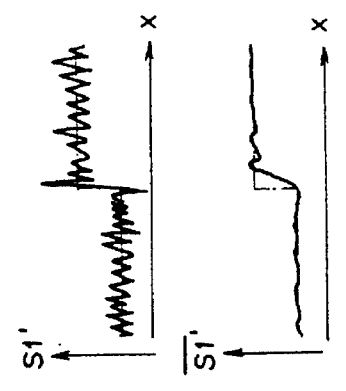
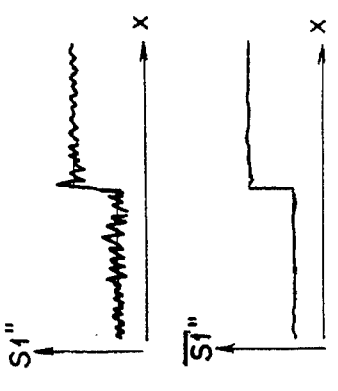
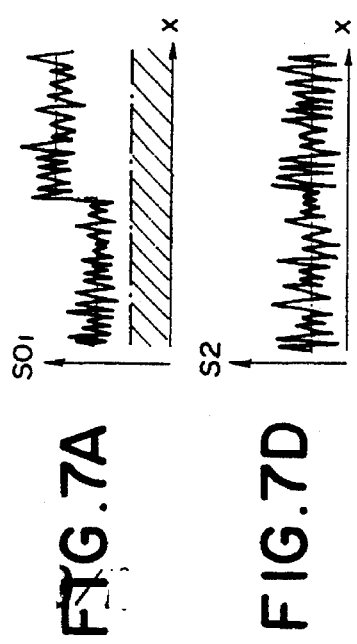
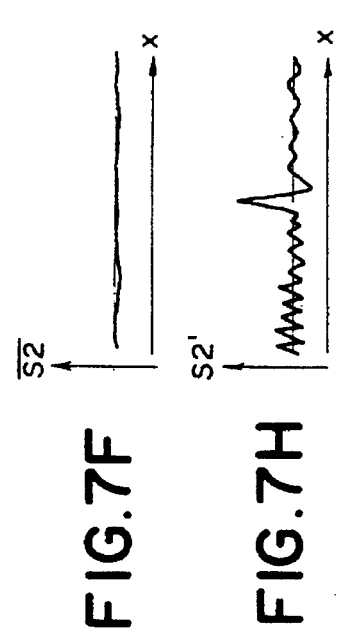
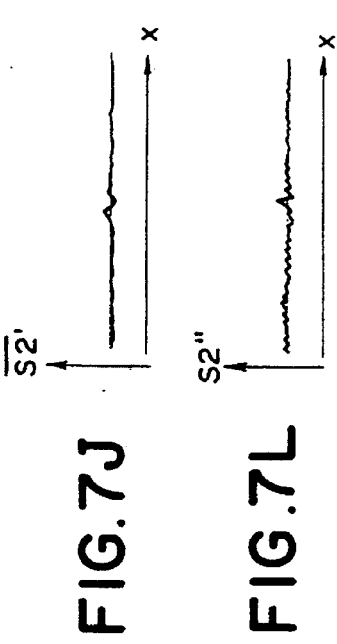

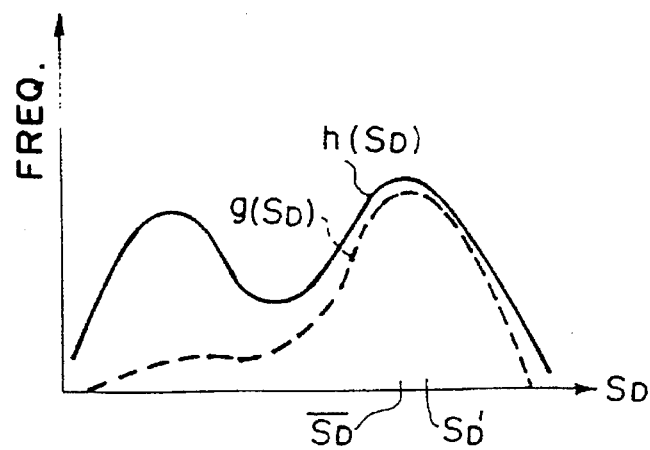
F I G. 12A
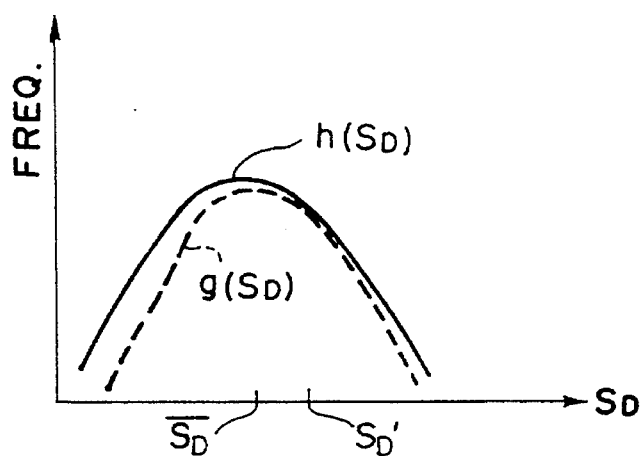
F I G. 12B
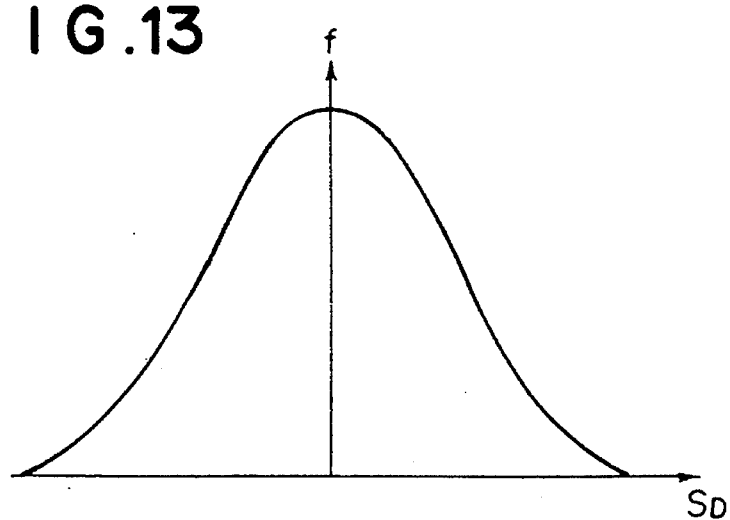
F I G. 13

METHOD FOR FORMING ENERGY SUBTRACTION RADIATON IMAGES, AND METHOD AND APPARATUS FOR SMOOTHING RADIATION IMAGES

BACKGROUND OF THE INVENTION

1. Field of the Invention

This invention relates to a method for forming an energy subtraction image wherein, from a plurality of radiation images, an energy subtraction image is formed which includes little noise and which has good image quality and can serve as an effective tool in, particularly, the efficient and accurate diagnosis of an illness. This invention also relates to an image smoothing method, which is to be used in the method for forming an energy subtraction image, and an apparatus for carrying out the image smoothing method.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. In this manner, a radiation image of the object is stored on the stimulable phosphor sheet. The stimulable phosphor sheet, on which the radiation image has been stored, is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order for the desired image density to be obtained, an appropriate read-out gain is set when the emitted light is being detected and converted into an electric signal (image signal) to be used in the reproduction of a visible image on a recording material, such as photographic film, or on a display device, such as a CRT.

In the radiation image recording and reproducing systems wherein recording media, such as X-ray film or stimulable phosphor sheets are used, subtraction processing techniques for radiation images are often carried out on image signals detected from a plurality of radiation images of an object which have been recorded on the recording media.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals which represent the image information recorded at corresponding sampling points in the radiation images are then subtracted from each other. A difference signal is thereby obtained which represents the image of a specific structure or part of the object represented by the radiation images.

Basically, subtraction processing is carried out with either the so-called temporal (time difference) subtraction processing method or the so-called energy subtraction processing method. In the former method, in order for the image of a specific structure (for example, a blood vessel) of an object to be extracted from the image of the whole object, the image signal representing a radiation image obtained without injection of contrast media is subtracted from the image signal representing a radiation image in which the image of the specific structure (for example, a blood vessel) of the object is enhanced by the injection of contrast media. In the latter method, such characteristics are utilized that a specific structure of an object exhibits different levels of radiation absorptivity with respect to radiation with different energy levels. Specifically, an object is exposed to several kinds of radiation with different energy levels, and a plurality of radiation images are thereby obtained in which different images of a specific structure are embedded. Thereafter, the image signals representing the plurality of the radiation images are weighted appropriately and subjected to a subtraction process in order to extract the image of the specific structure. The applicant proposed novel energy subtraction processing methods using stimulable phosphor sheets in, for example, U.S. Pat. Nos. 4,855,598 and 4,896,037.

A plurality of radiation images, which are subjected to energy subtraction processing, will herein be referred to as the "original images". An image signal representing a subtraction image is obtained by subtracting the image signals representing the original images from each other. Therefore, the image signal representing the subtraction image has a lower signal-to-noise ratio (S/N ratio) than the image signals representing the original images. As a result, the problems occur in that the image quality of the subtraction image becomes worse than the image quality of the original images.

By way of example, energy subtraction processing is often carried out in the manner described below. Specifically, an object, such as the chest of a human body, which is constituted of soft tissues and bones, is exposed to several kinds of radiation with different energy levels, and a plurality of radiation images of the object are thereby obtained. The plurality of the radiation images are read out, and a plurality of image signals representing the radiation images are generated. Energy subtraction processing is then carried out on the plurality of the image signals. From the energy subtraction processing, a soft tissue image signal is obtained which represents a soft tissue image primarily composed of patterns of the soft tissues of the object. Alternatively, a bone image signal is obtained which represents a bone image primarily composed of patterns of the bones of the object. Thereafter, the soft tissue image is reproduced as a visible image from the soft tissue image signal, or the bone image is reproduced as a visible image from the bone image signal. In the soft tissue image, the patterns of the bones have been erased. Therefore, patterns, which were behind the bone patterns or were rendered imperceptible by the bone patterns in the original images, become more perceptible in the soft tissue image than in the original images. Also, in the bone image, the patterns of the soft tissues have been erased. Therefore, patterns, which were behind the soft tissue patterns or were rendered imperceptible by the soft tissue patterns in the original images, become more perceptible in the bone image than in the original images. Accordingly, a subtraction image can be obtained which is well matched to the purposes of diagnosis. However, because the soft tissue image and the bone image are obtained from the subtraction processing, the problems occur in that noise components have been emphasized in the soft tissue image and the bone image than in the original images. From this point of view, the image quality of the soft tissue image and the bone image could not heretofore been kept good.

SUMMARY OF THE INVENTION

The primary object of the present invention is to provide a method for forming an energy subtraction image wherein, from a plurality of original images, a subtraction image is formed in which noise has been reduced to approximately the same level as that in original images and which has good image quality and can serve as an effective tool in, particularly, the efficient and accurate diagnosis of an illness.

Another object of the present invention is to provide an image smoothing method, which is to be used in the method for forming an energy subtraction image and with which an image is smoothed such that edges in the image (i.e. points at which the image density changes sharply, e.g. boundaries among patterns of a plurality of tissues of an object) may be kept sharp and no artifact may occur in the smoothed image.

The specific object of the present invention is to provide an apparatus for carrying out the image smoothing method.

The present invention provides a first method for forming an energy subtraction image, which comprises the steps of:

i) after a plurality of radiation images of an object are recorded on recording media by irradiating several kinds of radiation with different energy levels to said object, which is constituted of a plurality of tissues exhibiting different levels of radiation absorptivity with respect to the several kinds of radiation with different energy levels, and a plurality of original image signals representing the plurality of said radiation images are then detected, generating a first image signal, which represents a first image primarily composed of patterns of first tissues of said object, from the plurality of said original image signals, ii) generating a first smoothed image signal by processing said first image signal, said first smoothed image signal representing a first smoothed image in which noise components of said first image have been reduced or eliminated, and iii) generating a second image signal by subtracting said first smoothed image signal from an original image signal, said second image signal representing a second image primarily composed of patterns of second tissues of said object.

The first method for forming an energy subtraction image in accordance with the present invention may be embodied in various, substantially identical manners. For example, each of the steps of the first method for forming an energy subtraction image in accordance with the present invention may be divided even further into a plurality of steps. Alternatively, the operations may be carried out in different orders.

By way of example, as one of the embodiments which are substantially identical with the first method for forming an energy subtraction image, the present invention provides an embodiment which comprises the steps of:

i) after a plurality of radiation images of an object are recorded on recording media by irradiating several kinds of radiation with different energy levels to said object, which is constituted of a plurality of tissues exhibiting different levels of radiation absorptivity with respect to the several kinds of radiation with different energy levels, and a plurality of original image signals representing the plurality of said radiation images are then detected, generating a first image signal, which represents a first image primarily composed of patterns of first tissues of said object, and a second image signal, which represents a second image primarily composed of patterns of second tissues of said object, from the plurality of said original image signals, ii) generating a noise image signal by processing said first image signal, said noise image signal representing a noise image in which components representing the patterns of said first tissues and primarily constituting low spatial frequency components of said first image have been reduced or eliminated, and iii) generating a new second image signal by adding said noise image signal to said second image signal, said new second image signal representing a new second image primarily composed of the patterns of said second tissues of said object.

As will be described in detail later, this embodiment comprises operations which are substantially identical to those in the first method for forming an energy subtraction image in accordance with the present invention. The first method for forming an energy subtraction image in accordance with the present invention embraces such various, substantially identical embodiments.

The present invention also provides a second method for forming an energy subtraction image, which comprises the steps of:

i) after a plurality of radiation images of an object are recorded on recording media by irradiating several kinds of radiation with different energy levels to said object, which is constituted of a plurality of tissues exhibiting different levels of radiation absorptivity with respect to the several kinds of radiation with different energy levels, and a plurality of original image signals representing the plurality of said radiation images are then detected, carrying out a first process for generating a first image signal, which represents a first image primarily composed of patterns of first tissues of said object, from the plurality of said original image signals, ii) thereafter carrying out a second process, which comprises the steps of:

a) generating a first smoothed image signal by processing said first image signal, said first smoothed image signal representing a first smoothed image in which noise components of said first image have been reduced, and b) generating a second image signal by subtracting said first smoothed image signal from an original image signal, said second image signal representing a second image primarily composed of patterns of second tissues of said object, and iii) thereafter carrying out a third process, which comprises the steps of:

a) generating a second smoothed image signal by processing said second image signal, said second smoothed image signal representing a second smoothed image in which noise components of said second image have been reduced, and b) generating a new first image signal by subtracting said second smoothed image signal from an original image signal, said new first image signal representing a new first image primarily composed of the patterns of said first tissues of said object.

An image having better image quality can be obtained by repeating the second and third processes in the second method for forming an energy subtraction image in accordance with the present invention. Specifically, the present invention further provides a third method for forming an energy subtraction image, which comprises the steps of, after the processes in the second method for forming an energy subtraction image in accordance with the present invention have been carried out, repeating the following once or several times:

i) a new second process for generating a new second image signal by carrying out said second process in which said new first image signal obtained from said third process is taken as said first image signal in said second process, said new second image signal generated by said new second process representing a new second image primarily composed of the patterns of said second tissues of said object, and ii) a new third process for generating a new first image signal by carrying out said third process in which said new second image signal is taken as said second image signal in said third process, said new first image signal generated by said new third process representing a new first image primarily composed of the patterns of said first tissues of said object.

By applying the second or third method for forming an energy subtraction image in accordance with the present invention, a new second image signal can be generated ultimately which represents a new second image primarily composed of the patterns of the second tissues of the object. Specifically, the present invention still further provides a fourth method for forming an energy subtraction image, which comprises the steps of:

after the processes in the second or third method for forming an energy subtraction image in accordance with the present invention have been carried out, generating a new second image signal by carrying out said second process or said new second process in which said new first image signal obtained from said third process or said new third process is taken as said first image signal in said second process or said new second process, said new second image signal thus most recently generated representing a new second image primarily composed of the patterns of said second tissues of said object.

Each of the second to fourth methods for forming an energy subtraction image in accordance with the present invention includes steps similar to those of the first method for forming an energy subtraction image in accordance with the present invention. Therefore, as described above with reference to the first method for forming an energy subtraction image in accordance with the present invention, the second to fourth methods for forming an energy subtraction image in accordance with the present invention embraces various, substantially identical embodiments. Also, other steps, such as noise reducing processes, may be carried out before or after the first to fourth methods for forming an energy subtraction image in accordance with the present invention.

The terms "first image" and "second image" (or the terms "new first image" and "new second image") as used herein for the first to fourth methods for forming an energy subtraction image in accordance with the present invention mean two images, which have been obtained from energy subtraction processing and in which the patterns of different tissues of a single object have been emphasized or only such patterns are illustrated. The first image and the second image (or the new first image and the new second image) are not limited to specific images. For example, the first image and the second image (or the new first image and the new second image) may be a soft tissue image and a bone image. Alternatively, in cases where the object is a mamma of a human body, the first image and the second image (or the new first image and the new second image) may be an image, in which the patterns of mammary glands have been emphasized, and an image, in which the pattern of a malignant tumor has been emphasized.

The first to fourth methods for forming an energy subtraction image in accordance with the present invention are based on the findings that, because an image signal representing a subtraction image is obtained by subtracting the image signals representing the original images from each other, the image signal representing the subtraction image has a lower S/N ratio than the image signals representing the original images.

Specifically, with the first method for forming an energy subtraction image in accordance with the present invention, the first image signal, which represents a first image primarily composed of patterns of first tissues of the object, is generated by carrying out a subtraction process on a plurality of original image signals. The first smoothed image signal is then generated by processing the first image signal. The first smoothed image signal represents a first smoothed image in which noise components of the first image have been reduced or eliminated. Thereafter, the first smoothed image signal is subtracted from an original image signal, and the second image signal is thereby generated which represents a second image primarily composed of patterns of second tissues of the object. Therefore, a second image can be obtained in which noise has been reduced to approximately the same level as that in the original images and which has good image quality and can serve as an effective tool in, particularly, the efficient and accurate diagnosis of an illness.

In order for the second image having good image quality to be obtained, it is necessary that, in the course of generating the first smoothed image signal representing the first smoothed image, the signal components of the first image signal representing the patterns of the first tissues of the object can be kept uneliminated, and only the noise components of the first image signal can be eliminated. However, part of the spatial frequency components corresponding to the patterns of the first tissues and part of the spatial frequency components corresponding to the noise components are identical with each other. Therefore, even if a non-linear filter is utilized which eliminates as many noise components as possible, the noise components and the signal components of the first image signal representing the patterns of the first tissues of the object cannot be completely separated from each other.

Accordingly, with the second to fourth methods for forming an energy subtraction image in accordance with the present invention, instead of aiming at completely eliminating the noise components only with a single noise reducing process, a plurality of noise reducing processes are carried out sequentially such that an image can be obtained in which noise has been reduced and which has good image quality and can serve as an effective tool in, particularly, the efficient and accurate diagnosis of an illness.

Specifically, with the second method for forming an energy subtraction image in accordance with the present invention, a noise reducing process is carried out on the first image signal in order to generate the first smoothed image signal representing a first smoothed image in which noise components of the first image have been reduced. The second image signal is then generated by subtracting the first smoothed image signal from an original image signal. Thereafter, a noise reducing process is carried out on the second image signal in order to generate the second smoothed image signal representing a second smoothed image in which noise components of the second image have been reduced. The new first image signal is then generated by subtracting the second smoothed image signal from an original image signal. With the two noise reducing processes, noise components can be reduced in appropriate manners. Therefore, an image can be obtained which contains less noise and which has better image quality and can serve as a more effective tool in, particularly, the efficient and accurate diagnosis of an illness, than the first method for forming an energy subtraction image in accordance with the present invention.

With the third method for forming an energy subtraction image in accordance with the present invention, the steps of the second method for forming an energy subtraction image in accordance with the present invention are carried out repeatedly such that more noise components can be reduced. The respective noise reducing processes can be allotted with appropriate modes of processing. Therefore, an image can be obtained in which noise components have been reduced even further.

With the fourth method for forming an energy subtraction image in accordance with the present invention, after the steps of the second or third method for forming an energy subtraction image in accordance with the present invention have been carried out, a noise reducing process is carried out on the new first image signal, which has been generated by the second or third method for forming an energy subtraction image. In this manner, a new first smoothed image signal is generated. Thereafter, the new first smoothed image signal is subtracted from an original image signal. Accordingly, the new second image can be obtained in which noise components have been reduced.

The present invention also provides a first image smoothing method with which a smoothing process is carried out on an image signal made up of a series of image signal components representing picture elements in an image, the image smoothing method comprising the steps of:

i) generating a probability density function of image signal components of an image signal QL, which represent picture elements belonging to a predetermined region surrounding a predetermined picture element, each of the picture elements in the image being taken as said predetermined picture element, ii) calculating the values of a function g(QL) representing how frequently the values of image signal components of an image signal occur, which image signal has been processed, the calculation is carried out with the formula $$g(QL)=h(QL) \times f(QL-QC) \quad (1)$$

where h(QL) represents said probability density function representing how frequently the image signal components of said image signal QL occur, f(QL) represents a function, the value of which decreases monotonously as the absolute value |QL| of said image signal QL increases, and QC represents the value of the image signal component representing said predetermined picture element, iii) weighting the values of the image signal components of said image signal QL, which image signal components represent the picture elements belonging to said predetermined region, with the values of the function g(QL) representing how frequently the values of the image signal components of the processed image signal occur, iv) calculating a mean-level value QC' of the weighted values of the image signal components of said image signal QL, and v) in lieu of the value QC of the image signal component representing said predetermined picture element, employing said mean-level value QC' as the value of the image signal component representing said predetermined picture element.

The present invention further provides a second image smoothing method with which a smoothing process is carried out on an image signal made up of a series of image signal components representing picture elements in an image, the image smoothing method comprising the steps of:

i) from image signal components of said image signal, which represent picture elements belonging to a predetermined region surrounding a predetermined picture element, each of the picture elements in the image being taken as said predetermined picture element, finding the image signal components having values falling within the range of a value, which is smaller by a predetermined value than the value QC of the image signal component representing said predetermined picture element, to a value, which is larger by a predetermined value than the value QC of the image signal component representing said predetermined picture element, ii) calculating a mean-level value QC' of the values of the image signal components, which have thus been found, and iii) in lieu of the value QC of the image signal component representing said predetermined picture element, employing said mean-level value QC' as the value of the image signal component representing said predetermined picture element.

In the first and second image smoothing methods in accordance with the present invention, the predetermined region surrounding the predetermined picture element may be a region, which includes the predetermined picture element and is formed around the predetermined picture element. Alternatively, the predetermined region surrounding the predetermined picture element may be a region, which does not include a region including and neighboring with the predetermined picture element, but surrounds the neighboring region. In cases where, for example, edges in the image (i.e. points at which the image density changes sharply, e.g. boundaries among patterns of a plurality of tissues of an object) extend only along specific directions, the region which surrounds the neighboring region need not necessarily surround the whole circumference of the neighboring region.

The first image smoothing method in accordance with the present invention can be carried out with a first image smoothing apparatus in accordance with the present invention. Specifically, the present invention still further provides a first image smoothing apparatus with which a smoothing process is carried out on an image signal made up of a series of image signal components representing picture elements in an image, the image smoothing apparatus comprising:

i) a probability density function operating means for generating a probability density function of image signal components of an image signal QL, which represent picture elements belonging to a predetermined region surrounding a predetermined picture element, each of the picture elements in the image being taken as said predetermined picture element, ii) a probability density function processing means for calculating the values of a function g(QL) representing how frequently the values of image signal components of an image signal occur, which image signal has been processed, the calculation is carried out with the formula $$g(QL)=h(QL) \times f(QL-QC) \quad (1)$$

where h(QL) represents said probability density function representing how frequently the image signal components of said image signal QL occur, f(QL) represents a function, the value of which decreases monotonously as the absolute value |QL| of said image signal QL increases, and QC represents the value of the image signal component representing said predetermined picture element, and iii) an averaging means for:

weighting the values of the image signal components of said image signal QL, which image signal components represent the picture elements belonging to said predetermined region, with the values of the function g(QL) representing how frequently the values of the image signal components of the processed image signal occur, and calculating a mean-level value QC' of the weighted values of the image signal components of said image signal QL.

The second image smoothing method in accordance with the present invention can be carried out with a second image smoothing apparatus in accordance with the present invention. Specifically, the present invention also provides a second image smoothing apparatus with which a smoothing process is carried out on an image signal made up of a series of image signal components representing picture elements in an image, the image smoothing apparatus comprising an averaging means for:

from image signal components of said image signal, which represent picture elements belonging to a predetermined region surrounding a predetermined picture element, each of the picture elements in the image being taken as said predetermined picture element, finding the image signal components having values falling within the range of a value, which is smaller by a predetermined value than the value QC of the image signal component representing said predetermined picture element, to a value, which is larger by a predetermined value than the value QC of the image signal component representing said predetermined picture element, and calculating a mean-level value QC' of the values of the image signal components, which have thus been found.

In the first and second image smoothing apparatuses in accordance with the present invention, the predetermined region surrounding the predetermined picture element may be a region, which includes the predetermined picture element and is formed around the predetermined picture element. Alternatively, the predetermined region surrounding the predetermined picture element may be a region, which does not include a region including and neighboring with the predetermined picture element, but surrounds the neighboring region. In cases where, for example, edges in the image extend only along specific directions, the region which surrounds the neighboring region need not necessarily surround the whole circumference of the neighboring region.

In the first image smoothing method and the first image smoothing apparatus in accordance with the present invention, the value of the function f(QL) need not necessarily change for every absolute value |QL| of the image signal QL, and may not change for a certain range of absolute values |QL| of the image signal QL. Also, the function f(QL) may take on the form of, for example, a normal distribution, a triangular distribution, or a trapezoidal distribution, depending on the concept behind the design, or the like.

Also, no limitation is imposed on how the values of the image signal components of said image signal QL are weighted with the values of the function g(QL). For example, the weighting may be carried out with the formula g(QL)·QL, or $\{g(QL)\}^2 \cdot QL$.

In the first and second image smoothing methods in accordance with the present invention and the first and second image smoothing apparatuses in accordance with the present invention, the mean-level value is not limited to the mean value (arithmetical mean value), but may be the geometric mean value, the median value, or the like.

In general, parts of an image, which are located on both sides of an edge in the image, have different levels of mean image density (i.e. the mean value of the values of the image signal components corresponding to one of the parts of the image and the mean value of the values of the image signal components corresponding to the other part of the image are different from each other). In such cases, when the probability density function of the image signal components of the image signal QL is plotted, which image signal components represent picture elements belonging to a predetermined region in the vicinity of the edge, a plurality of projecting parts appear in the probability density function.

With the first image smoothing method and the first image smoothing apparatus in accordance with the present invention, the function f(QL) is employed, the value of which decreases monotonously as the absolute value |QL| of the image signal QL increases. Thereafter, the values of the function g(QL), which represent how frequently the values of image signal components of the processed image signal occur, are calculated with Formula (1). Therefore, typically, when the function g(QL) is plotted, it is composed only of the projecting part, to which the image signal component having the value of QC and representing the predetermined picture element belongs. Accordingly, even if the predetermined picture element is located very close to the edge, only the image signal components corresponding to the region, to which the predetermined picture element belongs, can be found in accordance with on which side of the edge the predetermined picture element is located. With the first image smoothing method and the first image smoothing apparatus in accordance with the present invention, the image signal components corresponding to the region, to which the predetermined picture element belongs, are found in this manner. The mean-level value QC' of the values of the image signal components corresponding to the region, to which the predetermined picture element belongs, is then calculated. Thereafter, the value QC' is employed as the value of the image signal component representing the predetermined picture element. Therefore, the smoothing process can be carried out such that edges in the image can be kept sharp and no artifact may occur in the smoothed image.

As described above, with the first image smoothing method and the first image smoothing apparatus in accordance with the present invention, the calculation is carried out with Formula (1) in order that only the projecting part, to which the image signal component having the value of QC and representing the predetermined picture element belongs, may be extracted from a plurality of projecting parts in the probability density function. Alternatively, with the second image smoothing method and the second image smoothing apparatus in accordance with the present invention, from the image signal components of the image signal, which represent picture elements belonging to a predetermined region surrounding a predetermined picture element, the image signal components having values falling within the range of a value, which is smaller by a predetermined value than the value QC of the image signal component representing the predetermined picture element, to a value, which is larger by a predetermined value than the value QC of the image signal component representing the predetermined picture element, are found. A calculation is then made to find the mean-level value QC' of the values of the image signal components, which have thus been found. Specifically, a calculation is made to find the mean-level value QC' of the values of the image signal components, which have values comparatively close to the value QC of the image signal component representing the predetermined picture element. Therefore, by carrying out a far simpler operation than the operation with Formula (1), effects can be obtained which are approximately identical with extracting only the projecting part, to which the image signal component having the value of QC and representing the predetermined picture element belongs, from a plurality of projecting parts in the probability density function. The mean-level value QC' is employed as the value of the image signal component representing the predetermined picture element. Accordingly, with the second image smoothing method and the second image smoothing apparatus in accordance with the present invention, the smoothing process can be carried out such that edges in the image can be kept sharp and no artifact may occur in the smoothed image. Also, the smoothing process can be carried out more quickly than the first image smoothing method and the first image smoothing apparatus in accordance with the present invention.

During a single operation, with which the mean-level value QC' is calculated for each predetermined picture element, the image signal components of the image signal are utilized, which represent picture elements belonging to a predetermined region surrounding the predetermined picture element. As described above, a region, which includes the predetermined picture element and is formed around the predetermined picture element, may be employed as the predetermined region. However, a region, which does not include a region including and neighboring with the predetermined picture element, but surrounds the neighboring region, should preferably be employed as the predetermined region. In such cases, even if the predetermined picture element is located in the vicinity of an edge in the image, the proportion of the part of the edge coming into the predetermined region becomes comparatively small, and a region slightly spaced apart from the edge will come in a comparatively large proportion into the predetermined region. Therefore, in the probability density function of the image signal components corresponding to the predetermined region, a plurality of projecting parts are comparatively far spaced apart from one another. As a result, only the projecting part, to which the image signal component having the value of QC and representing the predetermined picture element belongs, can be extracted more accurately from the plurality of the projecting parts in the probability density function. Accordingly, the smoothing process can be carried out more accurately such that edges in the image can be kept sharp.

BRIEF DESCRIPTION OF THE DRAWINGS

FIGS. 7A through 7M are graphs showing the profiles of the images, which are shown in FIG. 6, along a predetermined direction, FIGS. 12A and 12B are graphs showing examples of probability density functions of image signal components, which image signal components represent a plurality of picture elements belonging to a predetermined region having a predetermined picture element in the middle, FIG. 13 is a graph showing an example of a function, in which the value of an image signal SD serves as a variable.

DESCRIPTION OF THE PREFERRED EMBODIMENTS

The present invention will hereinbelow be described in further detail with reference to the accompanying drawings. In the embodiments described below, X-ray images are stored on stimulable phosphor sheets.

Figure 9:
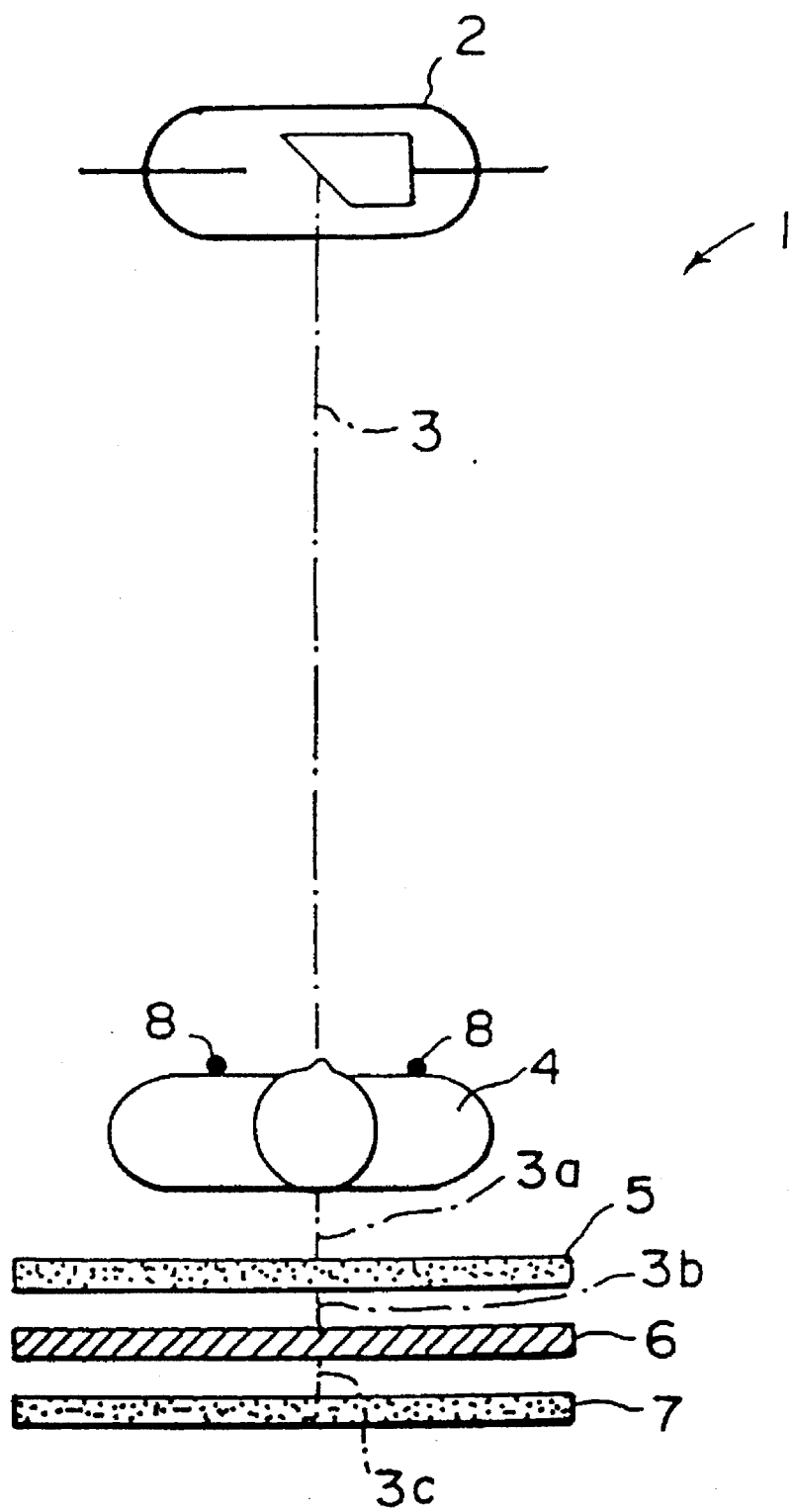
FIG. 9 is a schematic view showing an X-ray image recording apparatus.

FIG. 9 is a schematic view showing an X-ray image recording apparatus 1.

With reference to FIG. 9, X-rays 3 are produced by an X-ray tube 2 of the X-ray image recording apparatus 1 and irradiated to an object 4 (in this example, the chest of a human body). X-rays 3a, which have passed through the object 4, impinge upon a first stimulable phosphor sheet 5, and the comparatively low energy components of the X-rays 3a are stored on the first stimulable phosphor sheet 5. In this manner, an X-ray image of the object 4 is stored on the first stimulable phosphor sheet 5. X-rays 3b, which have passed through the first stimulable phosphor sheet 5, then pass through a filter 6 for filtering out the low energy components of the X-rays. X-rays 3c, which have passed through the filter 6 and are composed of the high energy components, impinge upon a second stimulable phosphor sheet 7. In this manner, an X-ray image of the object 4 is stored on the second stimulable phosphor sheet 7. During the image recording operation, marks 8, 8 are placed on the object 4. The images of the marks 8, 8 are utilized in the course of adjusting the positions of the two X-ray images so that the two X-ray images coincide with each other.

In the X-ray image recording apparatus 1, the X-ray images are stored on the first stimulable phosphor sheet 5 and the second stimulable phosphor sheet 7 with a single recording operation. Alternatively, the two X-ray images may be recorded one after the other with two independent recording operations.

Figure 10:
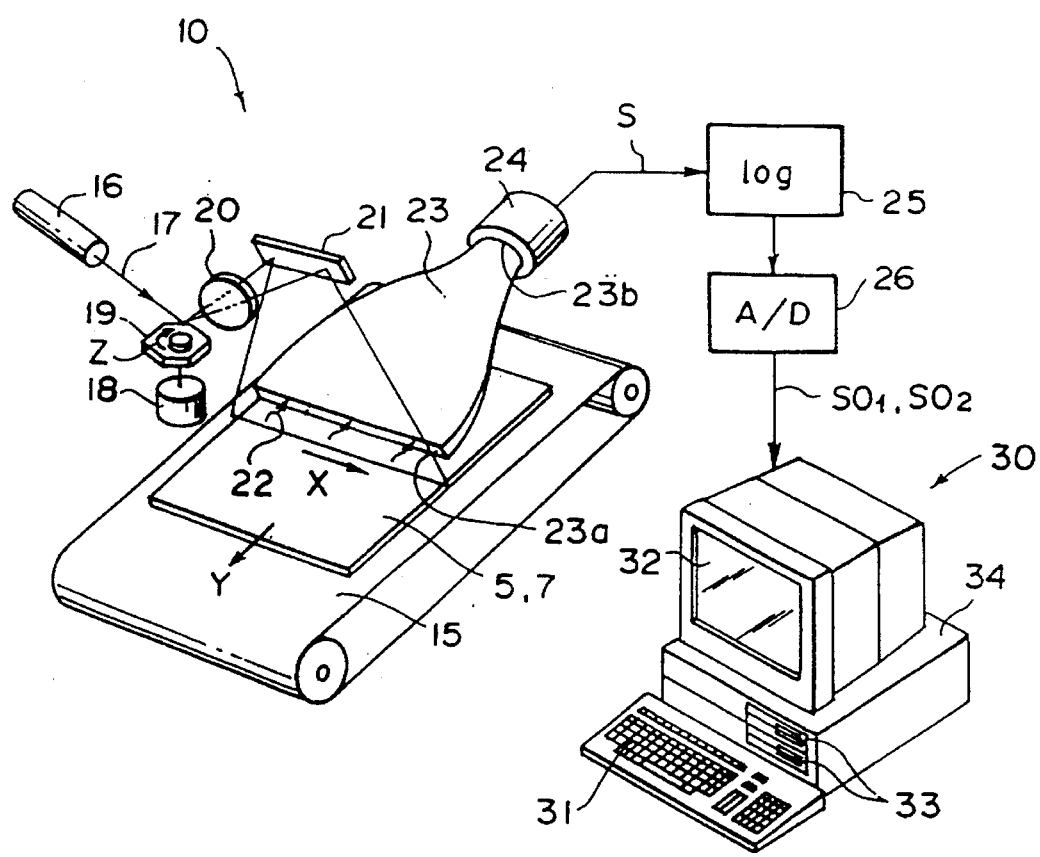
FIG. 10 is a perspective view showing an X-ray image read-out apparatus and an image processing and displaying apparatus wherein an embodiment of the method for forming an energy subtraction image in accordance with the present invention is employed.

FIG. 10 is a perspective view showing an X-ray image read-out apparatus 10 and an image processing and displaying apparatus 30 wherein an embodiment of the method for forming an energy subtraction image in accordance with the present invention is employed.

After the first X-ray image and the second X-ray image have been stored respectively on the first stimulable phosphor sheet 5 and the second stimulable phosphor sheet 7 in the X-ray image recording apparatus 1 shown in FIG. 9, the first stimulable phosphor sheet 5 and the second stimulable phosphor sheet 7 are placed one after the other at a predetermined position in the X-ray image read-out apparatus 10 shown in FIG. 10. How the first X-ray image is read out from the first stimulable phosphor sheet 5 will be described hereinbelow.

With reference to FIG. 10, the first stimulable phosphor sheet 5 is conveyed in a sub-scanning direction indicated by the arrow Y by a sheet conveyance means 15, which is constituted of an endless belt or the like and which is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Zo The laser beam 17 then passes through a converging lens 20, which is constituted of an fθ lens or the like. The direction of the optical path of the laser beam 17 is then changed by a mirror 21, and the laser beam 17 is caused to impinge upon the first stimulable phosphor sheet 5 and scan it in a main scanning direction indicated by the arrow X. The main scanning direction is approximately normal to the sub-scanning direction indicated by the arrow Y. When the first stimulable phosphor sheet 5 is exposed to the laser beam 17, the exposed portion of the first stimulable phosphor sheet 5 emits light 22 in an amount proportional to the amount of energy stored thereon during its exposure to the X-rays. The emitted light 22 is guided by a light guide member 23, and photoelectrically detected by a photomultiplier 24. The light guide member 23 is made from a light guiding material, such as an acrylic plate. The light guide member 23 has a linear light input face 23a, positioned to extend along the main scanning line on the first stimulable phosphor sheet 5, and a ring-shaped light output face 23b, positioned so that it is in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22, which amount represents the first X-ray image stored on the first stimulable phosphor sheet 5, is converted into an electric signal by the photomultiplier 24.

An analog signal S generated by the photomultiplier 24 is logarithmically amplified by a logarithmic amplifier 25, and fed into an A/D converter 26. The A/D converter 26 samples the analog signal S, and the sampled signal is converted into a digital image signal SO. The image signal SO thus obtained represents the first X-ray image, which was stored on the first stimulable phosphor sheet 5, and will hereafter be referred to as the first image signal SO1. The first image signal SO1 is stored in an internal memory of the image processing and displaying apparatus 30.

The image processing and displaying apparatus 30 is provided with a keyboard 31, from which various instructions are entered, and a CRT display device 32, which displays auxiliary information for instructions and a visible image represented by an image signal. The image processing and displaying apparatus 30 is also provided with a floppy disk drive unit 33, which receives and operates a floppy disk serving as an auxiliary storage medium, and a main body 34 which incorporates a CPU and the internal memory.

Thereafter, in the same manner as that described above, a second image signal SO2 is obtained which represents the second X-ray image stored on the second stimulable phosphor sheet 7. The second image signal SO2 is stored in the internal memory of the image processing and displaying apparatus 30.

Figure 1:
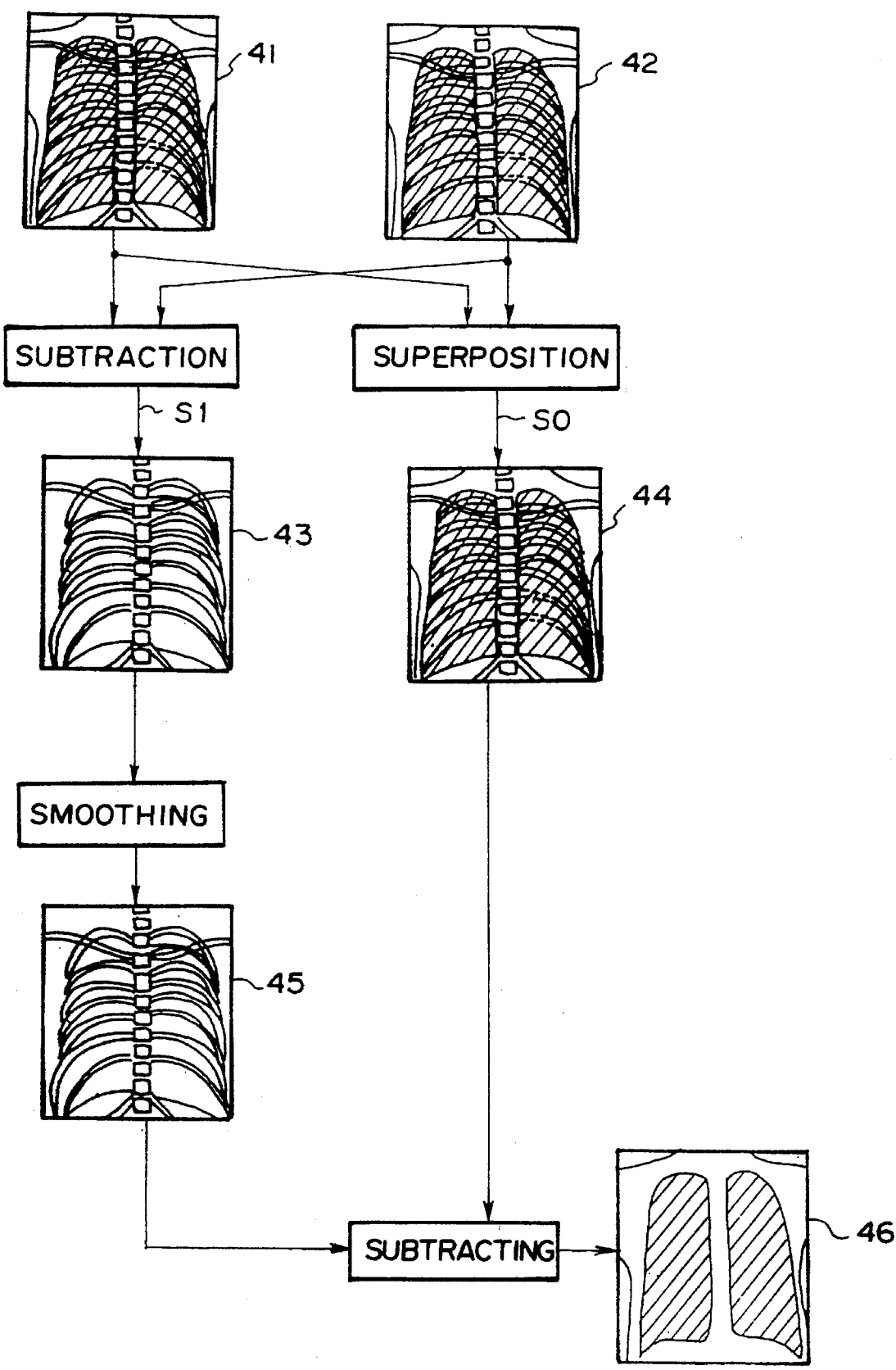
FIG. 1 is a flow chart showing the processes in an embodiment of the method for forming an energy subtraction image in accordance with the present invention, which are carried out in an image processing and displaying apparatus.

FIG. 1 is a flow chart showing the processes in an embodiment of the method for forming an energy subtraction image in accordance with the present invention, which are carried out in the image processing and displaying apparatus 30. The processes are carried out on the first image signal SO1 representing the first X-ray image and the second image signal SO2 representing the second X-ray image, which signals are stored in the internal memory of the image processing and displaying apparatus 30.

The first image signal SO1 and the second image signal SO2, which are stored in the internal memory of the image processing and displaying apparatus 30, represent a first X-ray image 41 and a second X-ray image 42 shown in FIG. 1. The first X-ray image 41 has been recorded with the comparatively low energy components of the X-rays. The second X-ray image 42 has been recorded with the comparatively high energy components of the X-rays. Both of the first X-ray image 41 and the second X-ray image 42 are original images composed of patterns of soft tissues and bones. The levels of image density of the soft tissue patterns and the bone patterns are different between the first X-ray image 41 and the second X-ray image 42.

The first image signal SO1 and the second image signal SO2 are read from the internal memory of the image processing and displaying apparatus 30. Position adjustment processing is then carried out on the first image signal SO1 and the second image signal SO2 such that the positions of the first X-ray image 41 represented by the first image signal SO1 and the second X-ray image 42 represented by the second image signal SO2 may coincide with each other. For this purpose, a method disclosed in, for example, U.S. Pat. No. 4,710,875 may be employed. With the position adjustment processing, one of the two X-ray images is linearly moved or rotated with respect to the other X-ray image until the images of the marks 8, 8 in one X-ray image, which marks are shown in FIG. 9, overlap the images of the marks 8, 8 in the other X-ray image.

Thereafter, a subtraction process is carried out on the first image signal SO1 and the second image signal SO2.

Specifically, X-ray absorption coefficients m are classified into the following:

$\mu_L^T$: Absorption coefficient of soft tissues with respect to the low energy components of X-rays.

$\mu_H^T$: Absorption coefficient of soft tissues with respect to the high energy components of X-rays.

$\mu_L^B$: Absorption coefficient of bones with respect to the low energy components of X-rays.

$\mu_H^B$: Absorption coefficient of bones with respect to the high energy components of X-rays.

The first image signal SO1 and the second image signal SO2 are weighted, and the image signal components of the weighted image signals are subtracted from each other which represent the image information stored at corresponding picture elements in the two X-ray images. Thus a bone image signal S1 is obtained, which can be expressed as $$S1 = SO1 - \frac{\mu_L^T}{\mu_H^T} SO2 + C \tag{2}$$

where C denotes a bias component. The bone image signal S1 represents a bone image 43 shown in FIG. 1, which image is composed of the bone patterns.

The first image signal SO1 and the second image signal SO2 may be weighted in a different way, and the image signal components of the weighted image signals may be subtracted from each other which represent the image information stored at corresponding picture elements in the two X-ray images. Thus a soft tissue image signal S2 can be obtained, which is expressed as $$S2 = \frac{\mu_L^B}{\mu_H^B} SO2 - SO1 + C' \tag{3}$$

where C' denotes a bias component. The soft tissue image signal S2 represents a soft tissue image composed of the soft tissue patterns. However, in this embodiment, the operations for generating the soft tissue image signal S2 need not be carried out.

Also, the image signal components of the first image signal SO1 and the second image signal SO2 are added to each other which represent the image information stored at corresponding picture elements in the two X-ray images. Thus a superposition image signal SO is obtained, which can be expressed as $$SO=(SO1+SO2)/2 \tag{4}$$

The superposition image signal SO represents a superposition image 44 shown in FIG. 1, which results from the superposition of the first X-ray image 41 and the second X-ray image 42 upon each other. The superposition image 44 can be referred to as an original image composed of the soft tissue patterns and the bone patterns. The first X-ray image 41 or the second X-ray image 42 may be utilized in lieu of the superposition image 44. However, the superposition image 44 should preferably be utilized. This is because the superposition image 44, which is obtained from the superposition of the first X-ray image 41 and the second X-ray image 42 upon each other, includes less noise components than the first X-ray image 41 and the second X-ray image 42, and therefore is advantageous for the subsequent processes.

Thereafter, the bone image signal S1 is processed such that noise components contained in the bone image 43 may be eliminated.

Figure 2:
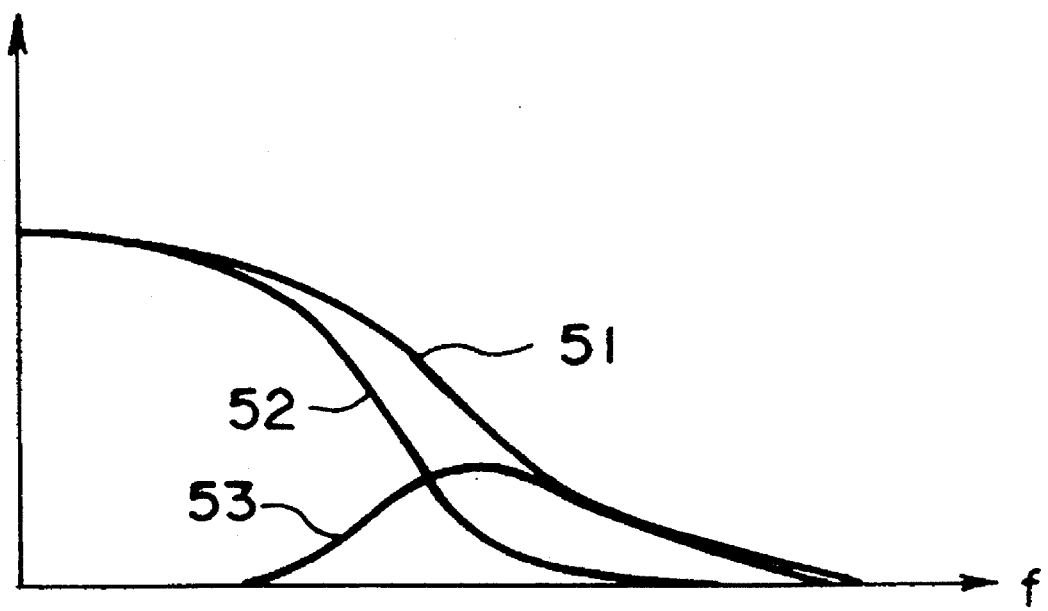
FIG. 2 is a graph showing spatial frequency spectra of a bone image and an image obtained by processing the bone image signal representing the bone image.

FIG. 2 is a graph showing spectra of a bone image and an image, which is obtained by processing the bone image signal representing the bone image, with respect to the spatial frequency, f.

In FIG. 2, curve 51 indicates the spectrum of the bone image 43, and curve 53 indicates the spectrum of noise components included in the bone image 43.

First, a smoothing process is carried out on the bone image signal S1. As the smoothing process, one of various processes may be employed. For example, a simple averaging process may be employed wherein the mean value of the values of the image signal components of an image signal, which represent the picture elements belonging to a predetermined region having a predetermined picture element in the middle, is calculated and employed as the value of the image signal component representing the predetermined picture element. Alternatively, a median filter process may be employed wherein the median value of the values of the image signal components of an image signal, which represent the picture elements belonging to a predetermined region having a predetermined picture element in the middle, is calculated and employed as the value of the image signal component representing the predetermined picture element. As another alternative, an edge keeping filter (V-filter) process may be employed wherein a predetermined region having a predetermined picture element in the middle is divided into a plurality of small regions, and the variance of the values of the image signal components corresponding to each small region is calculated. A small region associated with the smallest variance is then found, and the mean value of the values of the image signal components corresponding to the small region associated with the smallest variance is employed as the value of the image signal component representing the predetermined picture element. As a further alternative, a process may be employed wherein Fourier transformation is carried out on an image signal, the signal obtained from the Fourier transformation is subjected to an operation for removing high spatial frequency components corresponding to noise components, and thereafter inverse Fourier transformation is carried out. Such techniques are described in, for example, "Gazo-shori no Kihon-giho" (Basic Techniques for Image Processing), Guide to Techniques Edition, by Jun-ichi Hasegawa, Yamato Koshimizu, Akira Nakayama, and Shigeki Yokoi, Gijutsu Hyoron Sha.

However, the simple averaging process has the drawbacks in that edges in the image become unsharp. The median filter process has the drawbacks in that, because picture elements are interchanged, contour line-like artifacts often occur. The edge keeping filter process has the drawbacks in that honeycomb-like artifacts often occur. The Fourier transformation process has the drawbacks in that a long time is taken for operations to be carried out.

Therefore, in this embodiment, as will be described below, a smoothing process is carried out in which a filter adaptive to a probability density function is utilized. With the smoothing process, noise can be eliminated such that edges, which it is necessary to reproduce, may be kept sharp and no artifact may occur in the smoothed image. Also, noise can be eliminated quickly with simple operations.

Specifically, first, each of the picture elements in the bone image 43 is taken as a predetermined picture element, and the probability density function of the image signal components of the bone image signal S1 is generated, which represent a plurality of the picture elements belonging to a predetermined region having the predetermined picture element in the middle.

Figure 3A:
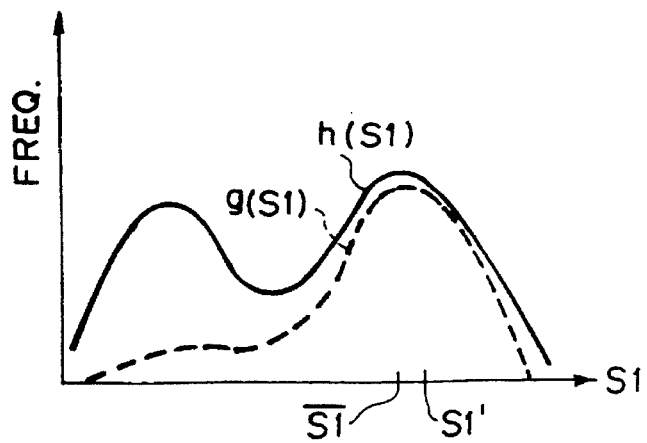
FIGS. 3A and 3B are graphs showing examples of probability density functions of image signal components, which image signal components represent a plurality of picture elements belonging to a predetermined region having a predetermined picture element in the middle.
Figure 3B:
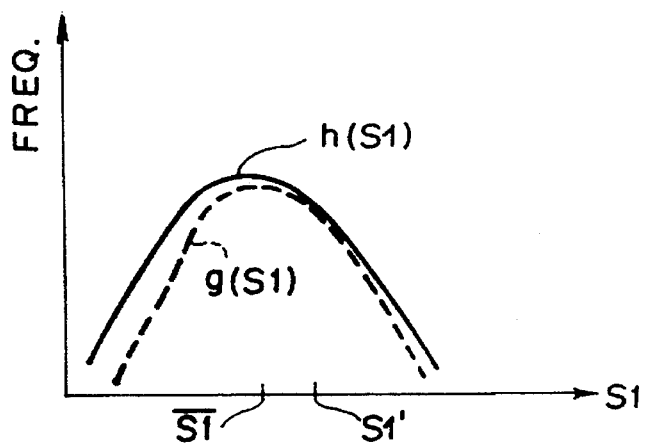
Figure 4:
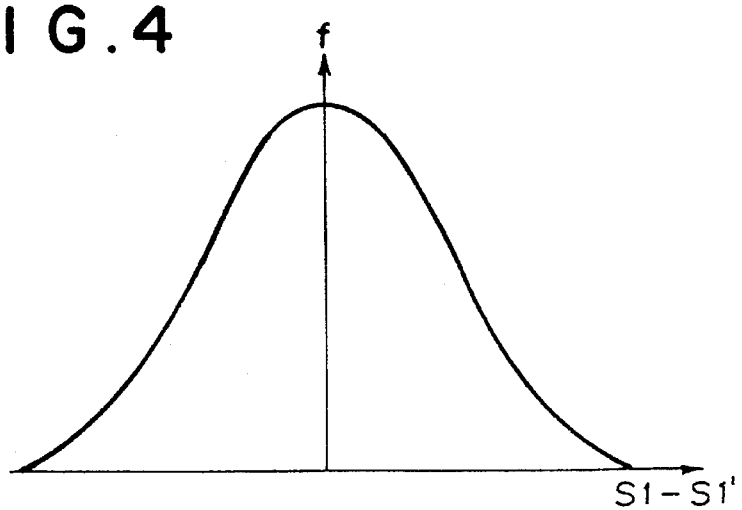
FIG. 4 is a graph showing an example of a function, in which the difference between the value of an image signal S1 and the value S1' of the image signal component representing a predetermined picture element located in the middle of a predetermined region serves as a variable.

FIGS. 3A and 3B are graphs showing examples of probability density functions of image signal components of the image signal S1, which image signal components represent a plurality of picture elements belonging to a predetermined region having a predetermined picture element in the middle. The image signal component representing the predetermined picture element has a value S1'. FIG. 4 is a graph showing an example of a function, in which the difference between the value of the image signal S1 and the value S1' of the image signal component representing the predetermined picture element located in the middle of the predetermined region serves as a variable.

The probability density functions shown in FIGS. 3A and 3B are denoted by h(S1). Also, a function, the value of which decreases monotonously as the absolute value |S1-S1'| increases, e.g. the function shown in FIG. 4, is denoted by f(S1-S1'). The values of a function g(S1) representing how frequently the values of image signal components of an image signal occur, which image signal has been processed, are calculated with the formula $$g(S1) = h(S1) \times f(S1-S1') \qquad (5)$$

In cases where the function h(S1) includes a plurality of projecting parts shown in FIG. 3A, the function g(S1) has the effects of extracting only of the projecting part, to which the image signal component having the value of S1' and representing the predetermined picture element belongs.

After the values of the function g(S1) have been calculated with Formula (5), the values of the image signal components of the image signal S1, which image signal components represent the picture elements belonging to the predetermined region, are weighted with the values of the function g(S1). A calculation is then made to find a mean-level value $\overline{S1}$ of the weighted values of the image signal components of the image signal S1. Specifically, by way of example, the moment of first order of the function g(S1) is calculated with the formula $$\overline{S1} = \int g(S1) \times S1 dS1 / \int g(S1) dS1 \qquad (6)$$

The picture elements in the bone image 43 are sequentially taken as the predetermined picture element, and the processes with Formulas (5) and (6) are carried out for all of the picture elements in the bone image 43. In this manner, a smoothed image signal $\overline{S1}$ is generated. (As an aid in facilitating the explanation, the same reference numeral is utilized to indicate both the value of the image signal component representing each picture element and the image signal representing the whole image.) As indicated by curve 52 in FIG. 2, the smoothed image signal $\overline{S1}$ is generated by primarily eliminating the high spatial frequency components from the bone image signal S1. As shown in FIG. 3A, as for a picture element located in the vicinity of an edge, the smoothed image signal $\overline{S1}$ has the mean-level value of the values belonging only to the projecting part, to which said picture element belongs. Therefore, edges in the bone image 43 can be kept sharp.

Thereafter, the superposition image signal SO, which is expressed as Formula (4) and represents the superposition image 44, and the smoothed image signal $\overline{S1}$ are weighted. The image signal components of the weighted smoothed image signal $\overline{S1}$ are subtracted from the image signal components of the weighted superposition image signal SO, which image signal components represent the image information stored at corresponding picture elements in the two X-ray images. Thus a soft tissue image signal S2' is obtained, which can be expressed as $$S2' = SO - \frac{\left(1 + \frac{\mu_L^B}{\mu_H^B}\right)}{2 \times \left(\frac{\mu_L^B}{\mu_H^B} - \frac{\mu_L^T}{\mu_H^T}\right)} \overline{S1} + C'' \qquad (7)$$

where C" denotes a bias component. The soft tissue image signal S2' represents a processed soft tissue image 46 shown in FIG. 1. The processed soft tissue image 46 has approximately the same image information as the soft tissue image expressed as Formula (3) and includes less noise components than the soft tissue image expressed as Formula (3).

The soft tissue image signal S2', which has been generated with Formula (7), is fed into the CRT display device 32 of the image processing and displaying apparatus 30. A visible image is reproduced from the soft tissue image signal S2' and displayed on the CRT display device 32.

In the embodiment described above, the soft tissue image signal S2 is generated by smoothing the bone image signal S1 and subtracting the smoothed signal from the original image signal representing the original image. In cases where a bone image is to be reproduced, the soft tissue image signal S2 is generated with Formula (3) and then smoothed. The smoothed signal is then subtracted from the original image signal representing the original image. In this manner, a bone image in which noise components have been reduced can be obtained.

Another embodiment of the method for forming an energy subtraction image in accordance with the present invention, which is substantially identical with the embodiment shown in FIG. 1, will be described hereinbelow.

Figure 5:
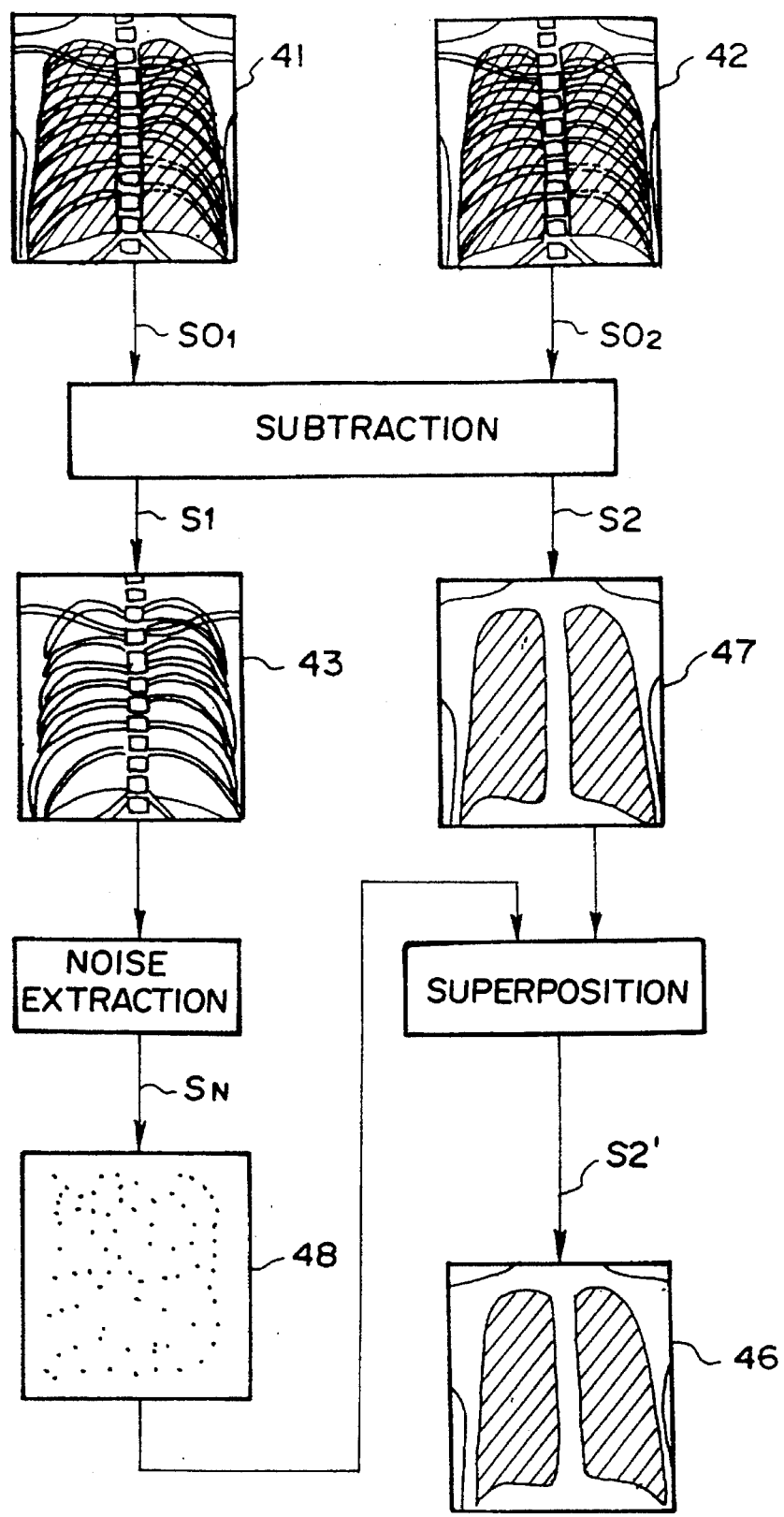
FIG. 5 is a flow chart showing the processes in another embodiment of the method for forming an energy subtraction image in accordance with the present invention, which processes are substantially identical with those shown in FIG. 1 and are carried out in an image processing and displaying apparatus.

As an aid in explaining the substantially identical embodiment, FIG. 5 shows how the image processing and displaying apparatus 30 carries out the processes on the first image signal SO1 representing the first X-ray image and the second image signal SO2 representing the second X-ray image, which signals are stored in the internal memory of the image processing and displaying apparatus 30. In FIG. 5, similar elements are numbered with the same reference numerals with respect to FIG. 1.

With reference to FIG. 5, the bone image signal S1 representing the bone image 43 and the soft tissue image signal S2 representing a soft tissue image 47 are generated by carrying out calculations with Formulas (2) and (3) from the first image signal SO1 representing the first X-ray image 41 and the second image signal SO2 representing the second X-ray image 42.

Thereafter, in the same manner as that in the embodiment of FIG. 1, the smoothed image signal $\overline{S1}$ representing the smoothed bone image, in which the noise components included in the bone image 43 have been reduced, is generated by processing the bone image signal S1 in accordance with Formulas (5) and (6). The image signal components of the smoothed image signal $\overline{S1}$ are then subtracted from the image signal components of the bone image signal S1, which image signal components represent the image information stored at corresponding picture elements in the two X-ray images. Thus a noise signal SN representing a noise image 48, which is composed of only the noise components, is obtained. The noise signal SN can be expressed as $$SN = S1 - \overline{S1} \quad (8)$$

As indicated by curve 53 in FIG. 2, the noise signal SN is composed of only the noise components included in the bone image 43. In the smoothed image signal $\overline{S1}$, even if the information representing the edges in the bone image 43 has a level of spatial frequency as high as that of the noise components, the information representing the edges will not be lost. Therefore, by carrying out the calculations with Formula (8) to find the difference between the bone image signal S1 and the smoothed image signal $\overline{S1}$, the noise signal SN can be obtained in which the information representing the edges has been completely canceled. Accordingly, the noise signal SN more accurately represents only the noise components of the bone image 43 than when a smoothing process was carried out such that the information representing the edges may be lost.

Thereafter, the noise signal SN and the soft tissue image signal S2 representing the soft tissue image 47 shown in FIG. 5 are weighted, and the image signal components of the weighted image signals are added to each other, which image signal components represent the image information stored at corresponding picture elements in the two images. Thus a soft tissue image signal S2' is obtained, which represents a processed soft tissue image 46 shown in FIG. 5. The processed soft tissue image 46 has approximately the same image information as the soft tissue image 47 and includes less noise components than the soft tissue image 47. In this embodiment, the calculations are carried out with the formula $$S2' = \quad (9)$$

$$\left\{ \left(1 + \frac{\mu_L^T}{\mu_H^T}\right) S2 + \left(1 + \frac{\mu_L^B}{\mu_H^B}\right) SN \right\} / 2 \times \left( \frac{\mu_L^B}{\mu_H^B} - \frac{\mu_L^T}{\mu_H^T} \right)$$

Therefore, the noise components can be reduced even further. As described above, the embodiment of FIG. 5 is substantially identical with the embodiment of FIG. 1. The reason for this will be described hereinbelow. The soft tissue image signal S2 expressed as Formula (3) and the noise signal SN expressed as Formula (8) are substituted into Formula (9). The bias component, such as C' in Formula (3), is used to adjust the image density of the whole image which is obtained ultimately (and to adjust the luminance in cases where the image is displayed on a CRT display device, or the like). Therefore, in the operations described below, the bias component is not taken into consideration.

Substitution of Formulas (3) and (8) into Formula (9) yields $$S2' = \left\{ \left(1 + \frac{\mu_L^T}{\mu_H^T}\right) \left( \frac{\mu_L^B}{\mu_H^B} SO2 - SO1 \right) + \left(1 + \frac{\mu_L^B}{\mu_H^B}\right) (S1 - \overline{S1}) \right\} / 2 \times \left( \frac{\mu_L^B}{\mu_H^B} - \frac{\mu_L^T}{\mu_H^T} \right) \quad (10)$$

Substitution of the bone image signal S1 expressed as Formula (2) into Formula (10) (with the bias component being ignored) yields $$S2' = \left\{ \left(1 + \frac{\mu_L^T}{\mu_H^T}\right) \left( \frac{\mu_L^B}{\mu_H^B} SO2 - SO1 \right) + \left(1 + \frac{\mu_L^B}{\mu_H^B}\right) \left( SO1 - \frac{\mu_L^T}{\mu_H^T} SO2 - \overline{S1} \right) \right\} / 2 \times \left( \frac{\mu_L^B}{\mu_H^B} - \frac{\mu_L^T}{\mu_H^T} \right) \quad (11)$$

Transforming and rearranging Formula (11) yield $$S2' = (SO1 + SO2)/2 - \frac{1 + \frac{\mu_L^B}{\mu_H^B}}{2 \times \left( \frac{\mu_L^B}{\mu_H^B} - \frac{\mu_L^T}{\mu_H^T} \right)} \overline{S1} \quad (12)$$

Substituting Formula (4) into Formula (12) yields $$S2' = SO - \frac{1 + \frac{\mu_L^B}{\mu_H^B}}{2 \times \left( \frac{\mu_L^B}{\mu_H^B} - \frac{\mu_L^T}{\mu_H^T} \right)} \overline{S1} \quad (13)$$

Formula (13) is identical with Formula (7), except for the bias component. Specifically, in the embodiments of FIG. 1 and FIG. 5, substantially identical processes are carried out.

Figure 6:
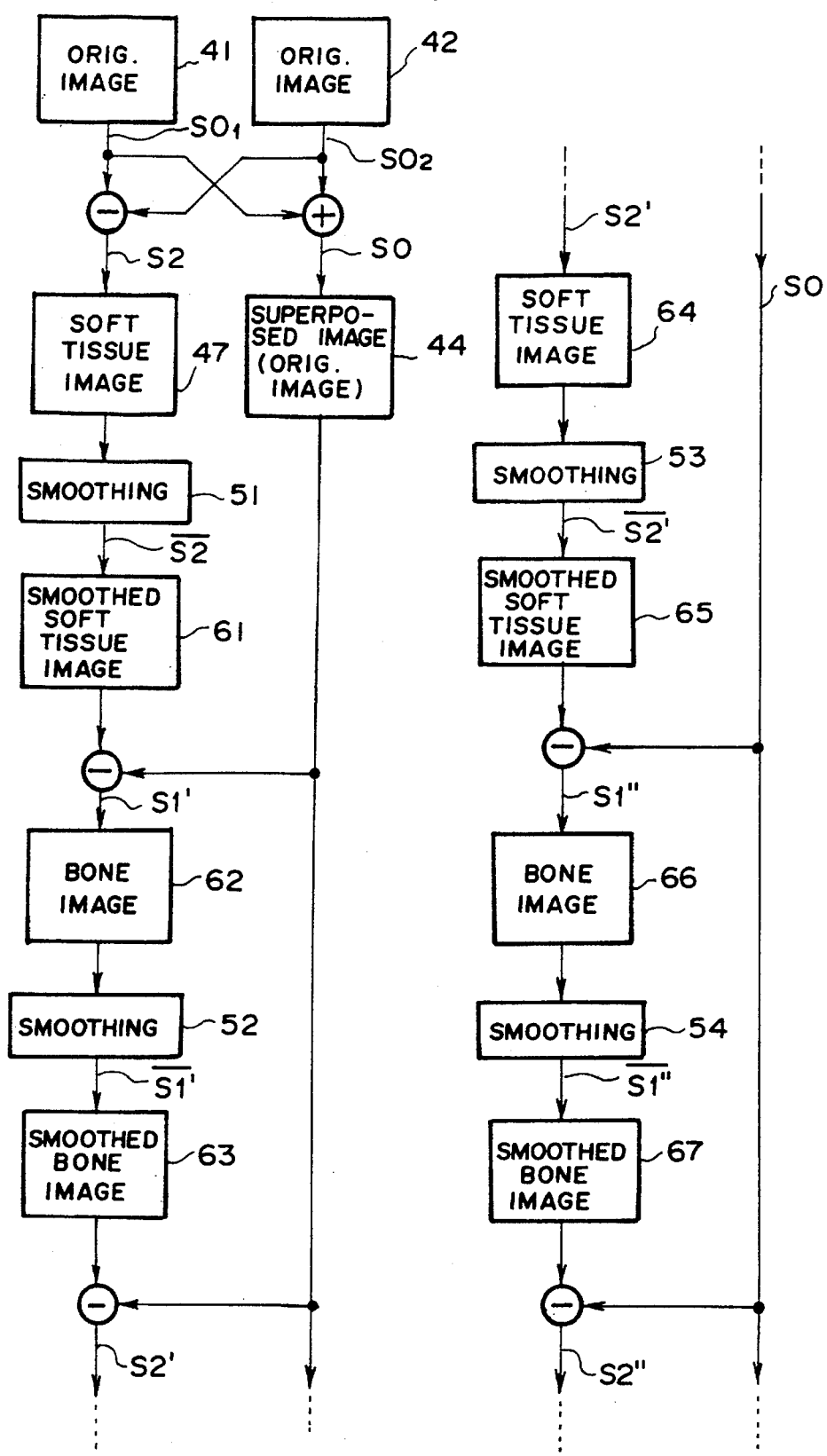
FIG. 6 is a flow chart showing the processes in a further embodiment of the method for forming an energy subtraction image in accordance with the present invention.

FIG. 6 is a flow chart showing the processes in a further embodiment of the method for forming an energy subtraction image in accordance with the present invention. FIGS. 7A through 7M are graphs showing the profiles of the images, which are shown in FIG. 6, along a predetermined direction. In FIG. 6, similar elements are numbered with the same reference numerals with respect to FIG. 1 or FIG. 5.

FIGS. 7A and 7B show the profiles of the first X-ray image 41 and the second X-ray image 42, which are original images. Specifically, FIG. 7A shows how the values of the image signal components of the first image signal SO1 representing the first X-ray image 41 are distributed, which image signal components represent the picture elements located along a predetermined direction (x direction) in the first X-ray image 41. FIG. 7B shows how the values of the image signal components of the second image signal SO2 representing the second X-ray image 42 are distributed, which image signal components represent the picture elements located along the predetermined direction (x direction) in the second X-ray image 42. The levels of the first image signal SO1 and the second image signal SO2 are different from each other. However, each of the first image signal SO1 and the second image signal SO2 is composed of the image signal components, which represent the soft tissue patterns (corresponding to the hatched region in FIG. 7A or 7B) and have approximately uniform values, the image signal components, which represent the bone patterns and have values changing step-wise, and the random noise components. These three types of image signal components are superposed one upon another.

By carrying out the weighting subtraction process (indicated by the symbol ⊖ in FIG. 6) with Formula (3) on the first image signal SO1 representing the first X-ray image 41 (original image) and the second image signal SO2 representing the second X-ray image 42 (original image), the soft tissue image signal S2 representing the soft tissue image 47 is generated. Also, by carrying out the addition process (indicated by the symbol ⊕ in FIG. 6) with Formula (4) on the first image signal SO1 and the second image signal SO2, the superposition image signal SO representing the superposition image 44 is generated.

FIG. 7C shows how the values of the image signal components of the superposition image signal SO are distributed. Like the first image signal SO1 shown in FIG. 7A and the second image signal SO2 shown in FIG. 7B, the superposition image signal SO is composed of the image signal components, which represent the soft tissue patterns (corresponding to the hatched region in FIG. 7C) and have approximately uniform values, the image signal components, which represent the bone patterns and have values changing step-wise, and the random noise components. These three types of image signal components are superposed one upon another. However, the superposition image signal SO includes less noise components than the first image signal SO1 shown in FIG. 7A and the second image signal SO2 shown in FIG. 7B.

FIG. 7D shows how the values of the image signal components of the soft tissue image signal S2, which has been generated with Formula (3), are distributed. The soft tissue image signal S2 is primarily composed of the image signal components, which represent the soft tissue patterns and have approximately uniform values. However, the soft tissue image signal S2 includes more random noise components than the first image signal SO1 shown in FIG. 7A and the second image signal SO2 shown in FIG. 7B.

FIG. 7E shows how the values of the image signal components of the bone image signal S1, which may be generated with Formula (2), are distributed. (In this embodiment, the bone image signal S1 need not be generated.) The bone image signal S1 is primarily composed of the image signal components, which represent the bone patterns and have values changing step-wise. However, like the soft tissue image signal S2 shown in FIG. 7D, the bone image signal S1 includes more random noise components than the first image signal SO1 shown in FIG. 7A and the second image signal SO2 shown in FIG. 7B.

As illustrated in FIG. 6, a smoothing process 51 is carried out on the soft tissue image signal S2, which represents the soft tissue image 47 and is distributed as shown in FIG. 7D. From the smoothing process 51, a smoothed soft tissue image signal $\overline{S2}$ is obtained, which represents a smoothed soft tissue image 61 and is distributed in the pattern shown in FIG. 7F. With the smoothing process 51, the spatial frequency components higher than a frequency of, for example, 1.0 cycle/mm are eliminated from the soft tissue image signal S2 representing the soft tissue image 47.

Thereafter, the superposition image signal SO and the smoothed soft tissue image signal $\overline{S2}$ are weighted, and the weighted smoothed soft tissue image signal $\overline{S2}$ is subtracted from the weighted superposition image signal SO. In this manner, a bone image signal S1' is obtained, which represents a bone image 62. As illustrated in FIG. 7G, the bone image signal S1' includes less random noise components than the bone image signal S1 shown in FIG. 7E. However, the bone image signal S1' slightly includes the high spatial frequency components of the soft tissue image 47 due to the smoothing process carried out on the soft tissue image 47.

A smoothing process 52 is then carried out on the bone image signal S1', which has been generated in the manner described above. With the smoothing process 52, patterns having low contrast and falling within the spatial frequency region higher than, for example, 0.5 cycle/mm are eliminated from the bone image 62 (i.e. small changes in the bone image signal S1' are eliminated). For this purpose, by way of example, the bone image signal S1' may be processed with a filter described below. Specifically, a window having an area corresponding to 0.5 cycle/mm is determined for a predetermined picture element P0. From the image signal components of the bone image signal S1' representing the picture elements belonging to the window, the image signal components are then found the values of which fall within the range of:

the value of an image signal component S1o' representing the predetermined picture element P0±a predetermined value.

Thereafter, the mean value of the image signal components, which have thus been found, is calculated and employed as the value of a new image signal component S1o' representing the predetermined picture element P0. With the smoothing process 52, a smoothed bone image signal $\overline{S1'}$ is obtained which represents a smoothed bone image 63. As illustrated in FIG. 7I, in the smoothed bone image signal $\overline{S1'}$ the noise components have been reduced. Also, the high spatial frequency components of the soft tissue image 47 due to the smoothing process carried out on the soft tissue image 47 have been reduced. However, the rising part of the smoothed bone image signal $\overline{S1'}$ becomes unsharp.

Thereafter, the superposition image signal SO and the smoothed bone image signal $\overline{S1'}$ are weighted, and weighted smoothed bone image signal $\overline{S1'}$ is subtracted from the weighted superposition image signal SO. In this manner, a soft tissue image signal S2' is obtained which represents a soft tissue image 64. As illustrated in FIG. 7H, the soft tissue image signal S2' includes less noise components than the soft tissue image signal S2 shown in FIG. 7D. Also, because the rising part of the smoothed bone image signal $\overline{S1'}$ shown in FIG. 7I is unsharp, the information representing the corresponding part of the bone image is included as noise in the soft tissue image signal S2'. However, the level of random noise and the level of the information, which represents the bone image and constitutes noise, are very low. Therefore, a series of the processes may be finished in this step. The soft tissue image signal S2' may be fed into the CRT display device 32 of the image processing and displaying apparatus 30 shown in FIG. 10, and a visible image may be reproduced from the soft tissue image signal S2' and displayed on the CRT display device 32.

However, in this embodiment, the same process as those described above are repeated even further such that an image having better image quality may be obtained.

After the soft tissue image signal S2' representing the soft tissue image 64 has been generated, a smoothing process 53 is carried out on the soft tissue image signal S2'. From the smoothing process 53, a smoothed soft tissue image signal $\overline{S2'}$ is obtained, which represents a smoothed soft tissue image 65 and is distributed in the pattern shown in FIG. 7J. With the smoothing process 53, the spatial frequency components higher than a frequency of, for example, 1.5 cycle/mm are eliminated from the soft tissue image signal S2'.

Thereafter, the superposition image signal S0 and the smoothed soft tissue image signal $\overline{S2'}$ are weighted, and the weighted smoothed soft tissue image signal $\overline{S2'}$ is subtracted from the weighted superposition image signal SO. In this manner, a bone image signal S1" is obtained, which represents a bone image 66. As illustrated in FIG. 7K, the bone image signal S1" includes less random noise components and less information, which represents the soft tissue image and constitutes noise, than the bone image signal S1' shown in FIG. 7G. In cases where a bone image is to be reproduced, a visible image may be reproduced from the bone image signal S1" and reproduced on the CRT display device 32.

In this embodiment, a smoothing process 54 is then carried out on the bone image signal S1", which has been generated in the manner described above. From the smoothing process 54, a smoothed bone image signal $\overline{S1"}$ is obtained, which represents a smoothed bone image 67 and is distributed in the pattern shown in FIG. 7M. With the smoothing process 54, patterns having low contrast and falling within the spatial frequency region higher than, for example, 1.0 cycle/mm are eliminated from the bone image 66.

Thereafter, the superposition image signal SO and the smoothed bone image signal $\overline{S1"}$ are weighted, and weighted smoothed bone image signal $\overline{S1"}$ is subtracted from the weighted superposition image signal SO. In this manner, a soft tissue image signal S2" is obtained. As illustrated in FIG. 7L, the soft tissue image signal S2" includes less random noise components and less information, which represents the bone image and constitutes noise, than the soft tissue image signal S2' shown in FIG. 7H.

In the manner described above, the smoothing processes and the weighting subtraction processes with respect to the superposition image signal SO (original image signal) are carried out repeatedly such that the bone images and soft tissue images, in which noise has been reduced sequentially, may be obtained alternately.

Figure 8:
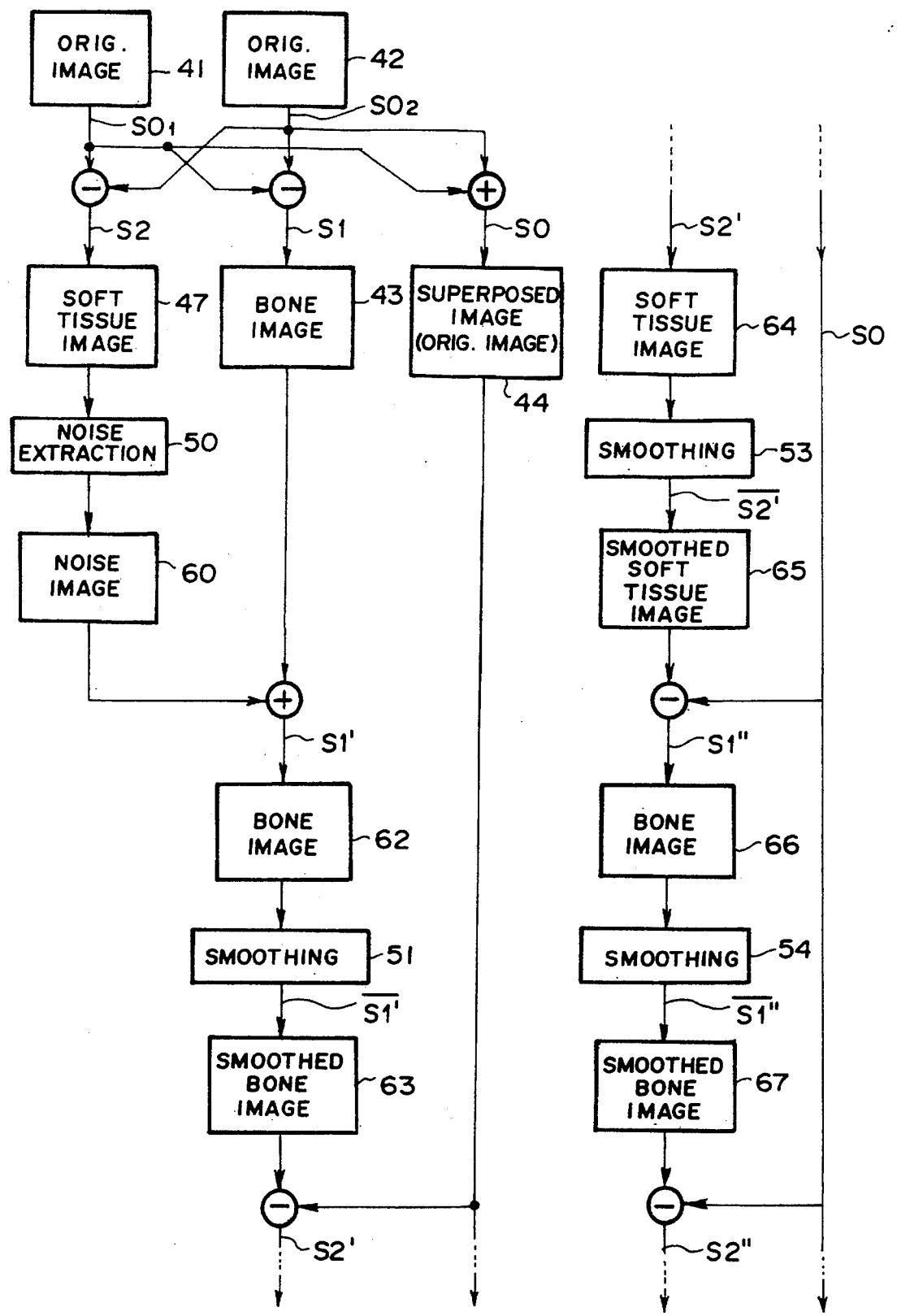
FIG. 8 is a flow chart showing the processes in a still further embodiment of the method for forming an energy subtraction image in accordance with the present invention, which processes are substantially identical with those shown in FIG. 6.

FIG. 8 is a flow chart showing the processes in a still further embodiment of the method for forming an energy subtraction image in accordance with the present invention, which processes are substantially identical with those shown in FIG. 6. In FIG. 8, similar elements are numbered with the same reference numerals with respect to FIG. 6.

In the embodiment of FIG. 8, the series of the processes for generating the bone image 62 in the embodiment of FIG. 6 (which processes correspond to the processed described above with reference to FIG. 1, except that the bone image and the soft tissue image are interchanged with each other) are replaced by the processes described above with reference to FIG. 5. In the embodiment of FIG. 8, the bone image and the soft tissue image in the processes shown in FIG. 5 are interchanged with each other. As described above, the embodiment of FIG. 8 is substantially identical with the embodiment of FIG. 6.

In the embodiment of FIG. 8, only the initial processes in the embodiment of FIG. 6 are replaced by the processes described above with reference to FIG. 5. Such replacement may be carried out at an arbitrary stage of the processes carried out repeatedly. Such embodiments are substantially identical with the embodiment of FIG. 6. The method for forming an energy subtraction image in accordance with the present invention embraces various such, substantially identical embodiments wherein at least one stage of the processes is modified.

In the aforesaid embodiments of the method for forming an energy subtraction image in accordance with the present invention, a soft tissue image or a bone image is formed from X-ray images of the chest of a human body. However, the method for forming an energy subtraction image in accordance with the present invention is not limited to the formation of the soft tissue image or the bone image, but is applicable widely when either one or both of two images, in which the patterns of two different tissues of a single object have been emphasized or only such patterns are illustrated. For example, two such images may be an image, in which the patterns of mammary glands have been emphasized, and an image, in which the pattern of a malignant tumor has been emphasized.

Also, in the aforesaid embodiments of the method for forming an energy subtraction image in accordance with the present invention, stimulable phosphor sheets are used. However, the method for forming an energy subtraction image in accordance with the present invention is also applicable when other recording media, such as X-ray film (ordinarily combined with intensifying screens), are used.

Embodiments of the image smoothing method in accordance with the present invention will be described hereinbelow. In the embodiments described below, X-ray images are stored on stimulable phosphor sheets.

Figure 14:
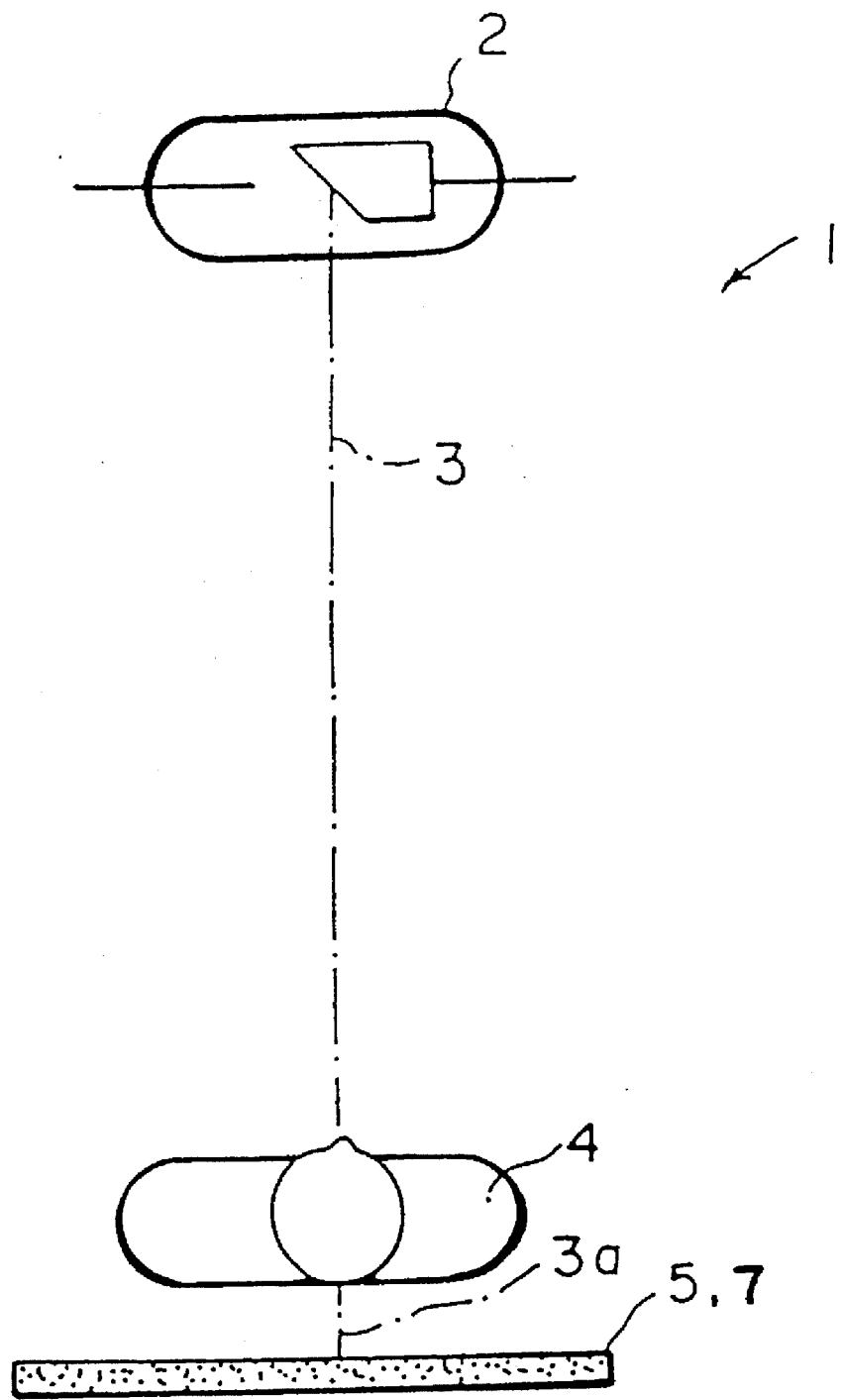
FIG. 14 is a schematic view showing an X-ray image recording apparatus.

FIG. 14 is a schematic view showing an X-ray image recording apparatus i.

With reference to FIG. 14, X-rays 3 are produced by an X-ray tube 2 of the X-ray image recording apparatus 1 and irradiated to an object 4 (in this example, the chest of a human body). X-rays 3a, which have passed through the object 4, impinge upon a stimulable phosphor sheet 5, and energy from the X-rays 3a is stored on the stimulable phosphor sheet 5. In this manner, an X-ray image of the object 4 is stored on the stimulable phosphor sheet 5.

After the X-ray image has been stored on the stimulable phosphor sheet 5 in the X-ray image recording apparatus 1 shown in FIG. 14, the X-ray image is read out from the stimulable phosphor sheet 5 in the same manner as that described above in the X-ray image read-out apparatus 10 shown in FIG. 10. A digital image signal SD representing the X-ray image is generated by the A/D converter 26. The digital image signal SD is fed into the image processing and displaying apparatus 30, in which an embodiment of the image smoothing method in accordance with the present invention is employed.

The image signal SD generated in the manner described above represents an X-ray image, which includes noise due to, for example, sway of the X-rays used during the recording of the X-ray image. A smoothing process is carried out on the image signal SD in the manner described below in order to reduce noise.

Figure 11:
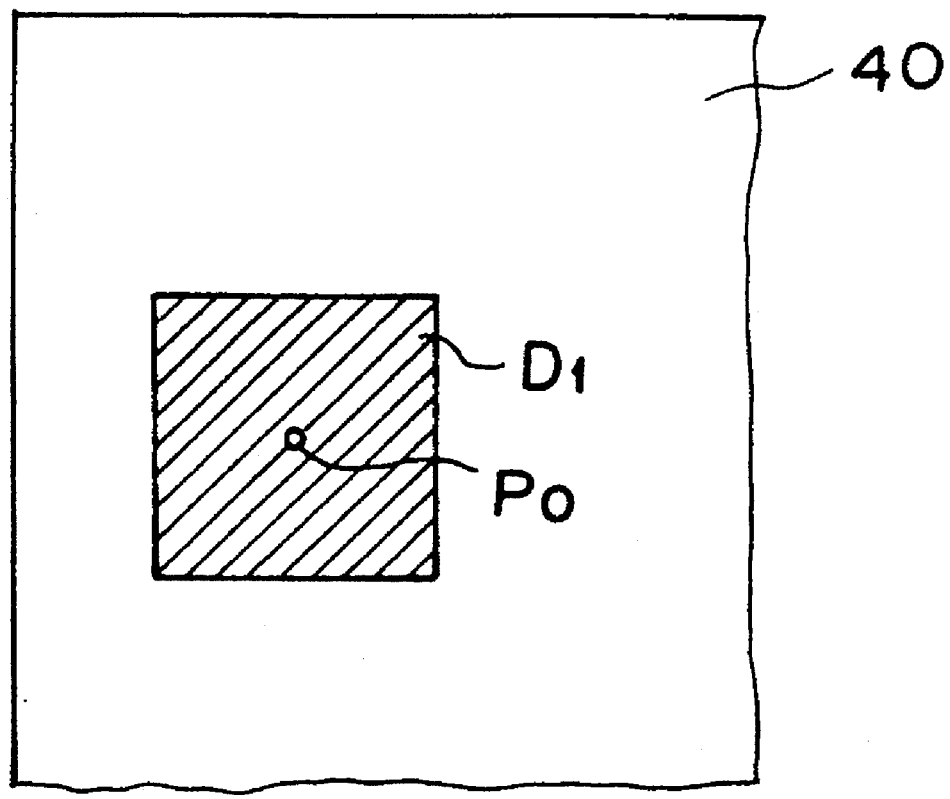
FIG. 11 is an explanatory view showing an example of a predetermined region in an X-ray image represented by an image signal SD.

FIG. 11 is an explanatory view showing an example of a predetermined region in an X-ray image represented by an image signal SD.

Each of picture elements in an X-ray image 40 is taken as a predetermined picture element P0, and a region D1 is determined which has the predetermined picture element P0 in the middle. Operations described below are carried out on the image signal components, which represent a plurality of picture elements belonging to the predetermined region D1. The operations are repeated for all of the picture elements in the X-ray image 40, which picture elements are sequentially taken as the predetermined picture element P0. The smoothing process is thus carried out on the X-ray image 40.

FIGS. 12A and 12B are graphs showing examples of probability density functions of image signal components of an image signal SD, which image signal components represent a plurality of picture elements belonging to a predetermined region D having a predetermined picture element P0 in the middle. The image signal component representing the predetermined picture element P0 has a value SD'. FIG. 13 is a graph showing an example of a function, in which the value of an image signal SD serves as a variable.

The X-ray image represented by the image signal SD and an image obtained by processing the image signal SD have the spectra with respect to the spatial frequency, f, as shown in FIG. 2.

Curve 51 shown in FIG. 2 indicates the spectrum of the X-ray image represented by the image signal SD. Noise components are included in the X-ray image.

The probability density functions shown in FIGS. 12A and 12B are denoted by h(SD). Also, a function, the value of which decreases monotonously as the absolute value |SD| increases, e.g. the function shown in FIG. 13, is denoted by f(SD). The values of a function g(SD) representing how frequently the values of image signal components of an image signal occur, which image signal has been processed, are calculated with the formula $$g(SD)=h(SD) \times f(SD-SD') \quad (14)$$

In cases where the function h(SD) includes a plurality of projecting parts shown in FIG. 12A, the function g(SD) has the effects of extracting only of the projecting part, to which the image signal component having the value of SD' and representing the predetermined picture element belongs.

After the values of the function g(SD) have been calculated with Formula (14), the values of the image signal components of the image signal SD, which image signal components represent the picture elements belonging to the predetermined region, are weighted with the values of the function g(SD). A calculation is then made to find a mean-level value $\overline{SD}$ of the weighted values of the image signal components of the image signal SD. Specifically, by way of example, the moment of first order of the function g(SD) is calculated with the formula $$\overline{SD} = \int g(SD) \times SDdSD / \int SDdSD \quad (15)$$

The moment of first order is employed as the mean-level value $\overline{SD}$.

The picture elements in the X-ray image are sequentially taken as the predetermined picture element P0, and the processes with Formulas (14) and (15) are carried out for all of the picture elements in the X-ray image. In this manner, a smoothed image signal $\overline{SD}$ is generated. (As an aid in facilitating the explanation, the same reference numeral is utilized to indicate both the value of the image signal component representing each picture element and the image signal representing the whole image.) As indicated by curve 52 in FIG. 2, the smoothed image signal $\overline{SD}$ is generated by primarily eliminating the high spatial frequency components (corresponding to curve 53) from the image signal SD. As shown in FIG. 12A, as for a picture element located in the vicinity of an edge, the smoothed image signal $\overline{SD}$ has the mean-level value of the values belonging only to the projecting part, to which said picture element belongs. Therefore, edges in the original X-ray image can be kept sharp.

After the smoothed image signal $\overline{SD}$ has been generated by the smoothing process described above, it is subjected to appropriate image processing, such as frequency response emphasizing processing. An image signal resulting from the image processing is fed into the CRT display device 32 of the image processing and displaying apparatus 30 shown in FIG. 10. A visible image is reproduced from the image signal and displayed on the CRT display device 32.

In the aforesaid embodiment of the image smoothing method in accordance with the present invention, the smoothing process is carried out on the image which is to be reproduced. However, the image smoothing method in accordance with the present invention is applicable widely when a smoothing process is carried out on various types of images. For example, as described above, the image smoothing method in accordance with the present invention may be employed when subtraction processes are carried out on a plurality of image signals representing a plurality of radiation images.

In such cases, in the X-ray image recording apparatus 1 shown in FIG. 14, a first X-ray image of the object 4 (the chest of a human body in this example) is stored on the stimulable phosphor sheet 5. Thereafter, the stimulable phosphor sheet 5 is quickly removed, and a stimulable phosphor sheet 7 is quickly placed in the X-ray image recording apparatus 1. Also, the tube voltage of the X-ray tube 2 is changed such that X-rays having a different energy level may be irradiated to the object 4. In this manner, a second X-ray image of the object 4 is stored on the stimulable phosphor sheet 7. The first X-ray image is stored on the stimulable phosphor sheet 5 with the X-rays having a comparatively low energy level. The second X-ray image is stored on the stimulable phosphor sheet 7 with the X-rays having a comparatively high energy level.

Alternatively, two stimulable phosphor sheets may be placed one upon the other with a filter, which absorbs low energy components of X-rays, intervening therebetween. In this manner, two X-ray images may be stored on the stimulable phosphor sheets 5 and 7 with a single, simultaneous exposure to X-rays.

After the X-ray images have been stored on the stimulable phosphor sheets 5 and 7 in the manner described above, the stimulable phosphor sheets 5 and 7 are placed one after the other in the X-ray image read-out apparatus 10 shown in FIG. 10. Image signals SD, SD are detected in the same manner as that described above and are fed into the image processing and displaying apparatus 30. The image signal SD representing the first X-ray image, which was stored on the stimulable phosphor sheet 5 with the X-rays having a low energy level, is referred to as the first image signal SO1. The image signal SD representing the second X-ray image, which was stored on the stimulable phosphor sheet 7 with the X-rays having a high energy level, is referred to as the second image signal SO2.

Thereafter, by way of example, in the processes shown in FIG. 5, the image smoothing method in accordance with the present invention is carried out on the bone image signal S1 such that noise components may be extracted from the bone image 43. From the smoothing process, the smoothed image signal S—1— is obtained in the same manner as that described above with reference to the aforesaid embodiment of the image smoothing method in accordance with the present invention. The noise signal SN is then generated with Formula (8). Thereafter, the noise signal SN and the soft tissue image signal S2 representing the soft tissue image 47 shown in FIG. 5 are weighted, and the image signal components of the weighted image signals are added to each other, which image signal components represent the image information stored at corresponding picture elements in the two images. The weighting addition process is expressed as Formula (9).

In this example, the noise signal SN is generated from the bone image signal S1 and added to the soft tissue image signal S2. In cases where a bone image is to be reproduced, a noise signal SN' may be generated from the soft tissue image signal S2 and added to the bone image signal S1.

Another embodiment of the image smoothing method in accordance with the present invention will be described hereinbelow.

Figure 15:
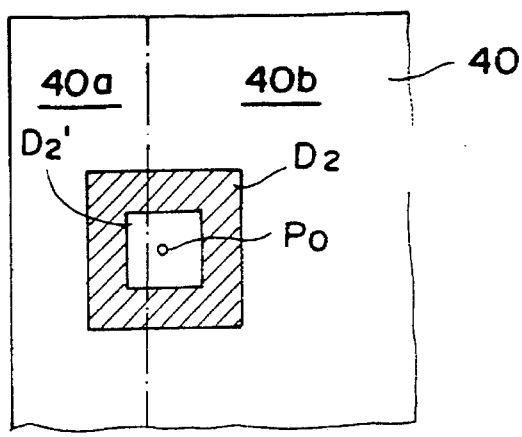
FIG. 15 is an explanatory view showing a predetermined region D2 in an X-ray image.

FIG. 15 is an explanatory view showing a predetermined region D2 in an X-ray image.

The predetermined region D2 does not include a region D2' including and neighboring with the predetermined picture element P0, but surrounds the neighboring region D2'. In this embodiment, the image signal components of the image signal SD, which represent the picture elements belonging to the predetermined region D2, are utilized when the smoothing process is carried out with respect to the predetermined picture element P0.

Figure 16:
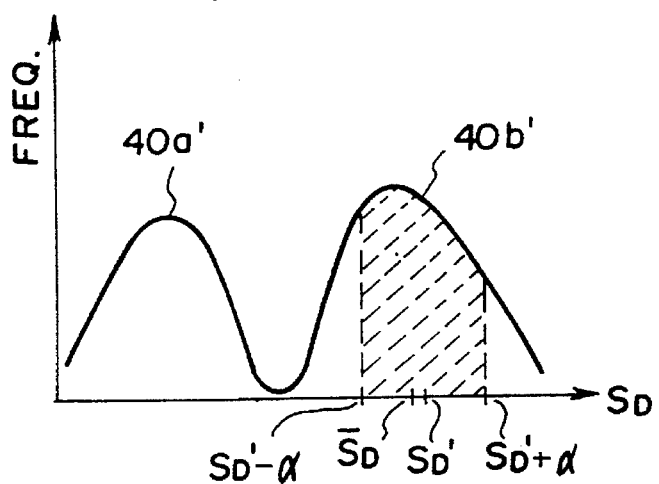
FIG. 16 is a graph showing an example of a probability density function of image signal components of an image signal SD, which represent a plurality of picture elements belonging to the predetermined region D2 shown in FIG. 15, in cases where a predetermined picture element P0 is located in the vicinity of an edge in the X-ray image.

FIG. 16 is a graph showing an example of a probability density function of image signal components of an image signal SD, which represent a plurality of picture elements belonging to the predetermined region D2 shown in FIG. 15, in cases where a predetermined picture element P0 is located in the vicinity of an edge in the X-ray image.

In the probability density function shown in FIG. 16, the two projecting parts are more clearly separated from each other than the probability density function shown in FIG. 12A.

By way of example, an edge is located at the position indicated by the chained line in FIG. 15. The image signal components of the image signal SD corresponding to a region 40a, which is located on the left side of the edge, have comparatively small values and therefore correspond to a left projecting part 40a' shown in FIG. 16. The image signal components of the image signal SD corresponding to a region 40b, which is located on the right side of the edge, have comparatively large values and therefore correspond to a right projecting part 40b' shown in FIG. 16. There is a high probability that the image signal components of the image signal SD, which represent the picture elements located on the edge or very close to the edge, will not belong to the groups of the image signal components corresponding to the the regions 40a and 40b shown in FIG. 15, but will have values falling in the middle between the values of the image signal components corresponding to the region 40a and the values of the image signal components corresponding to the region 40b. Specifically, there is a high probability that the image signal components of the image signal SD, which represent the picture elements located on the edge or very close to the edge, will fall within the region in the vicinity of the boundary between the projecting parts 40a' and 40b' in the probability density function shown in FIG. 16. Therefore, as illustrated in FIG. 15, when the smoothing process is carried out with respect to the predetermined picture element P0, the image signal components corresponding to the neighboring region D2' including and neighboring with the predetermined picture element P0 are omitted from the smoothing operations. In such cases, the image signal components of the image signal SD, which represent the picture elements located on the edge or very close to the edge, can be prevented from taking part in the smoothing operations.

Therefore, the plurality of the projecting parts in the probability density function can be separated clearly, and only the image signal components corresponding to the projecting part, to which the predetermined picture element P0 belongs, can be extracted accurately.

In this embodiment, as illustrated in FIG. 16, from the image signal components of the image signal SD, which represent the picture elements belonging to the region D2, the image signal components are found, which have values falling within the range of the value SD' of the image signal component representing the predetermined picture element P0±α, where α is a predetermined value. Specifically, the image signal components corresponding to the hatched region in FIG. 16 are found. Thereafter, the mean value $\overline{SD}$ of the values of the image signal components, which have thus been found, is calculated and employed as a new value of the image signal component representing the predetermined picture element P0. In this embodiment, the operations for finding the image signal components of the image signal SD, which have values falling within the range of the value SD' of the image signal component representing the predetermined picture element P0±α, correspond to the operations for finding the projecting part, to which the predetermined picture element P0 belongs. The operations for finding the image signal components, which have values falling within the range of SD'±α, are simpler than the operations in the aforesaid embodiment, and can therefore be carried out quickly.

Figure 17:
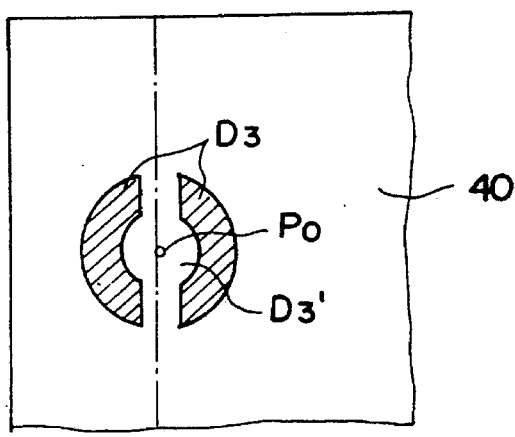
FIG. 17 is an explanatory view showing an example of a predetermined region in an X-ray image.

FIG. 17 is an explanatory view showing an example of a predetermined region in an X-ray image.

In FIG. 17, a region D3 is determined when the smoothing process is carried out with respect to a predetermined picture element P0. Like the region D2 shown in FIG. 15, the region D3 does not include a neighboring region D3' including and neighboring with the predetermined picture element P0. In this example, the region D3 is divided into two regions. In cases where it is already known that the edge extends vertically in FIG. 17, by determining the region D3 divided into the right and left regions, the image signal components representing the picture elements located on the edge or in the vicinity of the edge can be omitted from the operations. Therefore, the operations can be carried out more accurately.

As described above, the image smoothing method in accordance with the present invention may be embodied in various ways and employed in various cases. With the image smoothing method in accordance with the present invention, noise components can be reduced while edges in an image are being kept sharp.

In the aforesaid embodiments of the image smoothing method in accordance with the present invention, stimulable phosphor sheets are used. However, the image smoothing method in accordance with the present invention is also applicable when other recording media, such as X-ray film (ordinarily combined with intensifying screens), are used. Also, the image smoothing method in accordance with the present invention is not limited to the smoothing process on radiation images, but is applicable widely when various types of images are subjected to smoothing processes for reducing the noise components while edges in images are being kept sharp.

We claim:

1. A method for forming an energy subtraction image, which comprises the steps of:

i) after a plurality of radiation images of an object are recorded on recording media by radiation, having different energy distributions, having passed through said object, which is constituted of a plurality of tissues exhibiting different levels of radiation absorptivity and a plurality of original image signals representing the plurality of said radiation images are then detected, generating a first image signal, which represents a first image primarily composed of patterns of first tissues of said object, from the plurality of said original image signals, ii) generating a first smoothed image signal by processing said first image signal, said first smoothed image signal representing a first smoothed image in which noise components of said first image have been one of reduced and eliminated, and iii) generating a second image signal by subtracting said first smoothed image signal from a superposition image signal, which is obtained by carrying out an addition process on the plurality of said original image signals representing the plurality of said radiation images, said second image signal representing a second image primarily composed of patterns of second tissues of said object.

2. A method for forming an energy subtraction image which comprises the steps of:

i) after a plurality of radiation images of an object are recorded on recording media by radiation, having different energy distributions, having passed through said object, which is constituted of a plurality of tissues exhibiting different levels of radiation absorptivity and a plurality of original image signals representing the plurality of said radiation images are then detected, generating a first image signal, which represents a first image primarily composed of patterns of first tissues of said object, from the plurality of said original image signals, ii) generating a first smoothed image signal by processing said first image signal, said first smoothed image signal representing a first smoothed image in which noise components of said first image have been one of reduced and eliminated, said first smoothed image signal being generated from a smoothing process comprising the steps of:

a) generating a probability density function of image signal components of an image signal QL, which represent picture elements belonging to a predetermined region surrounding a predetermined picture element, each of the picture elements in the image being taken as said predetermined picture element, b) calculating the values of a function g(QL) representing how frequently the values of image signal components of an image signal occur, image signal being processed, the calculation being carded out with the formula $$g(QL)=h(QL) \times f(QL-QC)$$

where h(QL) represents said probability density function representing how frequently the image signal components of said image signal QL occur, f(QL) represents a function, the value of which decreases monotonously as the absolute value |QL| of said image signal QL increases, and QC represents the value of the image signal component representing said predetermined picture element, c) weighting the values of the image signal components of said image signal QL, image signal components representing the picture elements belonging to said predetermined region, with the values of the function g(QL) representing how frequently the values of the image signal components of the processed image signal occur, d) calculating a mean-level value QC' of the weighted values of the image signal components of said image signal QL, and e) in lieu of the value QC of the image signal component representing said predetermined picture element, employing said mean-level value QC' as the value of the image signal component representing said predetermined picture element, and iii) generating a second image signal by subtracting said first smoothed image signal from an original image signal, said second image signal representing a second image primarily composed of patterns of second tissues of said object.

3. A method for forming an energy subtraction image as defined in claim 2 wherein said predetermined region surrounding the predetermined picture element is a region, which includes the predetermined picture element and is formed around the predetermined picture element.

4. A method for forming an energy subtraction image as defined in claim 2 wherein said predetermined region surrounding the predetermined picture element is a region, which does not include a region including and neighboring with the predetermined picture element, but surrounds the neighboring region.

5. A method for forming an energy subtraction image which comprises the steps of:

i) after a plurality of radiation images of an object are recorded on recording media by radiation, having different energy distributions, having passed through said object, which is constituted of a plurality of tissues exhibiting different levels of radiation absorptivity and a plurality of original image signals representing the plurality of said radiation images are then detected, generating a first image signal, which represents a first image primarily composed of patterns of first tissues of said object, from the plurality of said original image signals, ii) generating a first smoothed image signal by processing said first image signal, said first smoothed image signal representing a first smoothed image in which noise components of said first image have been one of reduced and eliminated, said first smoothed image signal is generated from a smoothing process comprising the steps of:

a) from image signal components of said image signal, which represent picture elements belonging to a predetermined region surrounding a predetermined picture element, each of the picture elements in the image being taken as said predetermined picture element, finding the image signal components having values falling within the range of a value, which is smaller by a predetermined value than the value QC of the image signal component representing said predetermined picture element, to a value, which is larger by a predetermined value than the value QC of the image signal component representing said predetermined picture element, b) calculating a mean-level value QC' of the values of the image signal components, which have thus been found, and c) in lieu of the value QC of the image signal component representing said predetermined picture element, employing said mean-level value QC' as the value of the image signal component representing said predetermined picture element, and iii) generating a second image signal by subtracting said first smoothed image signal from an original image signal, said second image signal representing a second image primarily composed of patterns of second tissues of said object.

6. A method for forming an energy subtraction image as defined in claim 5 wherein said predetermined region surrounding the predetermined picture element is a region, which includes the predetermined picture element and is formed around the predetermined picture element.

7. A method for forming an energy subtraction image as defined in claim 5 wherein said predetermined region surrounding the predetermined picture element is a region, which does not include a region including and neighboring with the predetermined picture element, but surrounds the neighboring region.

8. A method for forming an energy subtraction image as defined in one of claims 1, 2 or 5 wherein said recording media are stimulable phosphor sheets.

9. A method for forming an energy subtraction image as defined in claim 8 wherein each of the plurality of said original image signals representing the plurality of said radiation images is obtained by exposing each said stimulable phosphor sheet to stimulating rays, which cause said stimulable phosphor sheet to emit light in proportion to the amount of energy stored thereon during its exposure to the radiation, and photoelectrically detecting the emitted light.

10. A method for forming an energy subtraction image as defined in claim 9 wherein said stimulating rays are a laser beam.

11. A method for forming an energy subtraction image as defined in one of claims 1, 2 or 5 wherein said recording media are photographic film.

12. A method for forming an energy subtraction image, which comprises the steps of:

i) after a plurality of radiation images of an object are recorded on recording media by radiation with different energy distributions, having passed through said object, which is constituted of a plurality of tissues exhibiting different levels of radiation absorptivity and a plurality of original image signals representing the plurality of said radiation images are then detected, carrying out a first process for generating a first image signal, which represents a first image primarily composed of patterns of first tissues of said object, from the plurality of said original image signals, ii) thereafter carrying out a second process, which comprises the steps of:

a) generating a first smoothed image signal by processing said first image signal, said first smoothed image signal representing a first smooth image in which noise components of said first image have been reduced, and b) generating a second image signal by subtracting said first smoothed image signal from an original image signal, said second image signal representing a second image primarily composed of patterns of second tissues of said object, and iii) thereafter carrying out a third process, which comprises the steps of:

a) generating a second smoothed image signal by processing said second image signal, said second smoothed image signal representing a second smoothed image in which noise components of said second image have been reduced, and b) generating a first new image signal by subtracting said second smoothed image signal from an original image signal, said new first image signal representing a new first image primarily composed of the patterns of said first tissues of said object.

13. A method for forming an energy subtraction image as defined in claim 12 wherein a superposition image signal, which is obtained by carrying out an addition process on the plurality of said original image signals representing the plurality of said radiation images, is employed as said original image signal, from which said first smoothed image signal is subtracted, and/or as said original image signal, from which said second smoothed image signal is subtracted.

14. A method for forming an energy subtraction image as defined in claim 12 wherein said first smoothed image signal and/or said second smoothed image signal is generated from a smoothing process comprising the steps of:

i) generating a probability density function of image signal components of an image signal QL, which represent picture elements belonging to a predetermined region surrounding a predetermined picture element, each of the picture elements in the image being taken as said predetermined picture element, ii) calculating the values of a function g(QL) representing how frequently the values of image signal components of an image signal occur, which image signal has been processed, the calculation is carried out with the formula $$g(QL)=h(QL) \times f(QL-QC)$$

where h(QL) represents said probability density function representing how frequently the image signal components of said image signal QL occur, f(QL) represents a function, the value of which decreases monotonously as the absolute value |QL| of said image signal QL increases, and QC represents the value of the image signal component representing said predetermined picture element, iii) weighting the values of the image signal components of said image signal QL, which image signal components represent the picture elements belonging to said predetermined region, with the values of the function g(QL) representing how frequently the values of the image signal components of the processed image signal occur, iv) calculating a mean-level value QC' of the weighted values of the image signal components of said image signal QL, and v) in lieu of the value QC of the image signal component representing said predetermined picture element, employing said mean-level value QC' as the value of the image signal component representing said predetermined picture element.

15. A method for forming an energy subtraction image as defined in claim 14 wherein said predetermined region surrounding the predetermined picture element is a region, which includes the predetermined picture element and is formed around the predetermined picture element.

16. A method for forming an energy subtraction image as defined in claim 15 wherein said predetermined region surrounding the predetermined picture element is a region, which does not include a region including and neighboring with the predetermined picture element, but surrounds the neighboring region.

17. A method for forming an energy subtraction image as defined in claim 12 wherein said first smoothed image signal and/or said second smoothed image signal is generated from a smoothing process comprising the steps of:

i) from image signal components of said image signal, which represent picture elements belonging to a predetermined region surrounding a predetermined picture element, each of the picture elements in the image being taken as said predetermined picture element, finding the image signal components having values falling within the range of a value, which is smaller by a predetermined value than the value QC of the image signal component representing said predetermined picture element, to a value, which is larger by a predetermined value than the value QC of the image signal component representing said predetermined picture element, ii) calculating a mean-level value QC' of the values of the image signal components, which have thus been found, and iii) in lieu of the value QC of the image signal component representing said predetermined picture element, employing said mean-level value QC' as the value of the image signal component representing said predetermined picture element.

18. A method for forming an energy subtraction image as defined in claim 17 wherein said predetermined region surrounding the predetermined picture element is a region, which includes the predetermined picture element and is formed around the predetermined picture element.

19. A method for forming an energy subtraction image as defined in claim 17 wherein said predetermined region surrounding the predetermined picture element is a region, which does not include a region including and neighboring with the predetermined picture element, but surrounds the neighboring region.

20. A method for forming an energy subtraction image as defined in claim 12 wherein said recording media are stimulable phosphor sheets.

21. A method for forming an energy subtraction image as defined in claim 20 wherein each of the plurality of said original image signals representing the plurality of said radiation images is obtained by exposing each said stimulable phosphor sheet to stimulating rays, which cause said stimulable phosphor sheet to emit light in proportion to the amount of energy stored thereon during its exposure to the radiation, and photoelectrically detecting the emitted light.

22. A method for forming an energy subtraction image as defined in claim 21 wherein said stimulating rays are a laser beam.

23. A method for forming an energy subtraction image as defined in claim 12 wherein said recording media are photographic film.

24. A method for forming an energy subtraction image, which comprises the steps of, after the processes defined in claim 12 have been carried out, repeating the following once or several times:

i) a new second process for generating a new second image signal by carrying out said second process in which said new first image signal obtained from said third process is taken as said first image signal in said second process, said new second image signal generated by said new second process representing a new second image primarily composed of the patterns of said second tissues of said object, and ii) a new third process for generating a new first image signal by carrying out said third process in which said new second image signal is taken as said second image signal in said third process, said new first image signal generated by said new third process representing a new first image primarily composed of the patterns of said first tissues of said object.

25. A method for forming an energy subtraction image as defined in claim 24 wherein a superposition image signal, which is obtained by carrying out an addition process on the plurality of said original image signals representing the plurality of said radiation images, is employed as said original image signal, from which said first smoothed image signal is subtracted, and/or as said original image signal, from which said second smoothed image signal is subtracted.

26. A method for forming an energy subtraction image as defined in claim 24 wherein said first smoothed image signal and/or said second smoothed image signal is generated from a smoothing process comprising the steps of:

i) generating a probability density function of image signal components of an image signal QL, which represent picture elements belonging to a predetermined region surrounding a predetermined picture element, each of the picture elements in the image being taken as said predetermined picture element, ii) calculating the values of a function g(QL) representing how frequently the values of image signal components of an image signal occur, which image signal has been processed, the calculation is carried out with the formula $$g(QL)=h(QL) \times f(QL13\ QC)$$

where h(QL) represents said probability density function representing how frequently the image signal components of said image signal QL occur, f(QL) represents a function, the value of which decreases monotonously as the absolute value |QL| of said image signal QL increases, and QC represents the value of the image signal component representing said predetermined picture element, iii) weighting the values of the image signal components of said image signal QL, which image signal components represent the picture elements belonging to said predetermined region, with the values of the function g(QL) representing how frequently the values of the image signal components of the processed image signal occur, iv) calculating a mean-level value QC' of the weighted values of the image signal components of said image signal QL, and v) in lieu of the value QC of the image signal component representing said predetermined picture element, employing said mean-level value QC' as the value of the image signal component representing said predetermined picture element.

27. A method for forming an energy subtraction image as defined in claim 26 wherein said predetermined region surrounding the predetermined picture element is a region, which includes the predetermined picture element and is formed around the predetermined picture element.

28. A method for forming an energy subtraction image as defined in claim 26 wherein said predetermined region surrounding the predetermined picture element is a region, which does not include a region including and neighboring with the predetermined picture element, but surrounds the neighboring region.

29. A method for forming an energy subtraction image as defined in claim 24 wherein said first smoothed image signal and/or said second smoothed image signal is generated from a smoothing process comprising the steps of:

i) from image signal components of said image signal, which represent picture elements belonging to a predetermined region surrounding a predetermined picture element, each of the picture elements in the image being taken as said predetermined picture element, finding the image signal components having values falling within the range of a value, which is smaller by a predetermined value than the value QC of the image signal component representing said predetermined picture element, to a value, which is larger by a predetermined value than the value QC of the image signal component representing said predetermined picture element, ii) calculating a mean-level value QC' of the values of the image signal components, which have thus been found, and iii) in lieu of the value QC of the image signal component representing said predetermined picture element, employing said mean-level value QC' as the value of the image signal component representing said predetermined picture element.

30. A method for forming an energy subtraction image as defined in claim 29 wherein said predetermined region surrounding the predetermined picture element is a region, which includes the predetermined picture element and is formed around the predetermined picture element.

31. A method for forming an energy subtraction image as defined in claim 29 wherein said predetermined region surrounding the predetermined picture element is a region, which does not include a region including and neighboring with the predetermined picture element, but surrounds the neighboring region.

32. A method for forming an energy subtraction image as defined in claim 24 wherein said recording media are stimulable phosphor sheets.

33. A method for forming an energy subtraction image as defined in claim 32 wherein each of the plurality of said original image signals representing the plurality of said radiation images is obtained by exposing each said stimulable phosphor sheet to stimulating rays, which cause said stimulable phosphor sheet to emit light in proportion to the amount of energy stored thereon during its exposure to the radiation, and photoelectrically detecting the emitted light.

34. A method for forming an energy subtraction image as defined in claim 33 wherein said stimulating rays are a laser beam.

35. A method for forming an energy subtraction image as defined in claim 24 wherein said recording media are photographic film.

36. A method for forming an energy subtraction image, which comprises the steps of:

after the processes defined in claim 12 or claim 24 have been carried out, generating a new second image signal by carrying out said second process or said new second process in which said new first image signal obtained from said third process or said new third process is taken as said first image signal in said second process or said new second process, said new second image signal thus most recently generated representing a new second image primarily composed of the patterns of said second tissues of said object.

37. An image smoothing method with which a smoothing process is carried out on an image signal made up of a series of image signal components representing picture elements in an image, the image smoothing method comprising the steps of:

i) generating a probability density function of image signal components of an image signal QL, which represent picture elements belonging to a predetermined region surrounding a predetermined picture element, each of the picture elements in the image being taken as said predetermined picture element, ii) calculating the values of a function g(QL) representing how frequently the values of image signal components of an image signal occur, which image signal has been processed, the calculation is carried out with the formula $$g(QL)=h(QL) \times f(QL-QC)$$

where h(QL) represents said probability density function representing how frequently the image signal components of said image signal QL occur, f(QL) represents a function, the value of which decreases monotonously as the absolute value |QL| of said image signal QL increases, and QC represents the value of the image signal component representing said predetermined picture element, iii) weighting the values of the image signal components of said image signal QL, which image signal components represent the picture elements belonging to said predetermined region, with the values of the function g(QL) representing how frequently the values of the image signal components of the processed image signal occur, iv) calculating a mean-level value QC' of the weighted values of the image signal components of said image signal QL, and v) in lieu of the value QC of the image signal component representing said predetermined picture element, employing said mean-level value QC' as the value of the image signal component representing said predetermined picture element.

38. An image smoothing method as defined in claim 37 wherein said predetermined region surrounding the predetermined picture element is a region, which includes the predetermined picture element and is formed around the predetermined picture element.

39. An image smoothing method as defined in claim 37 wherein said predetermined region surrounding the predetermined picture element is a region, which does not include a region including and neighboring with the predetermined picture element, but surrounds the neighboring region.

40. An image smoothing method with which a smoothing process is carried out on an image signal made up of a series of image signal components representing picture elements in an image, the image smoothing method comprising the steps of:

i) from image signal components of said image signal, which represent picture elements belonging to a predetermined region surrounding a predetermined picture element, each of the picture elements in the image being taken as said .predetermined picture element, finding the image signal components having values falling within the range of a value, which is smaller by a predetermined value than the value QC of the image signal component representing said predetermined picture element, to a value, which is larger by a predetermined value than the value QC of the image signal component representing said predetermined picture element, ii) calculating a mean-level value QC' of the values of the image signal components, which have thus been found, and iii) in lieu of the value QC of the image signal component representing said predetermined picture element, employing said mean-level value QC' as the value of the image signal component representing said predetermined picture element.

41. An image smoothing method as defined in claim 40 wherein said predetermined region surrounding the predetermined picture element is a region, which includes the predetermined picture element and is formed around the predetermined picture element.

42. An image smoothing method as defined in claim 40 wherein said predetermined region surrounding the predetermined picture element is a region, which does not include a region including and neighboring with the predetermined picture element, but surrounds the neighboring region.

43. An image smoothing apparatus with which a smoothing process is carried out on an image signal made up of a series of image signal components representing picture elements in an image, the image smoothing apparatus comprising:
i) a probability density function operating means for generating a probability density function of image signal components of an image signal QL, which represent picture elements belonging to a predetermined region surrounding a predetermined picture element, each of the picture elements in the image being taken as said predetermined picture element, ii) a probability density function processing means for calculating the values of a function g(QL) representing how frequently the values of image signal components of an image signal occur, which image signal has been processed, the calculation is carried out with the formula $$g(QL)=h(QL) \times f(QL-QC)$$

where h(QL) represents said probability density function representing how frequently the image signal components of said image signal QL occur, f(QL) represents a function, the value of which decreases monotonously as the absolute value |QL| of said image signal QL increases, and QC represents the value of the image signal component representing said predetermined picture element, and iii) an averaging means for:
weighting the values of the image signal components of said image signal QL, which image signal components represent the picture elements belonging to said predetermined region, with the values of the function g(QL) representing how frequently the values of the image signal components of the processed image signal occur, and calculating a mean-level value QC' of the weighted values of the image signal components of said image signal QL.

44. An image smoothing apparatus as defined in claim 43 wherein said predetermined region surrounding the predetermined picture element is a region, which includes the predetermined picture element and is formed around the predetermined picture element.

45. An image smoothing apparatus as defined in claim 43 wherein said predetermined region surrounding the predetermined picture element is a region, which does not include a region including and neighboring with the predetermined picture element, but surrounds the neighboring region.

46. An image smoothing apparatus for carrying out a smoothing process on an image signal made up of a series of image signal components, each of said image signal components representing an individual picture element and belonging to a predetermined region surrounding a predetermined picture element, the image smoothing apparatus comprising:

means for finding the image signal components having values falling with a predetermined range, said predetermined range ranging from a first value which is smaller by a predetermined amount than a value QC of an image signal component within the predetermined region, to a second value which is larger by a predetermined amount than the value QC of the image signal component within the predetermined region, each of the picture elements in the image being selected as said predetermined picture element; and means for calculating a mean-level value QC' for the image signal components, which have thus been found.

47. An image smoothing apparatus as defined in claim 46 wherein said predetermined region surrounding the predetermined picture element is a region, which includes the predetermined picture element and is formed around the predetermined picture element.

48. An image smoothing apparatus as defined in claim 46 wherein said predetermined region surrounding the predetermined picture element is a region, which does not include a region including and neighboring with the predetermined picture element, but surrounds the neighboring region.

* * * * *